US007869074B2

(12) United States Patent
Uno

(10) Patent No.: US 7,869,074 B2
(45) Date of Patent: Jan. 11, 2011

(54) COMMUNICATION SYSTEM, INFORMATION PROCESSING DEVICE, PERIPHERAL DEVICE AND COMMUNICATION METHOD

(75) Inventor: Fumitoshi Uno, Okazaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 957 days.

(21) Appl. No.: 11/693,419

(22) Filed: Mar. 29, 2007

(65) Prior Publication Data

US 2007/0195363 A1 Aug. 23, 2007

Related U.S. Application Data

(63) Continuation-in-part of application No. 11/533,078, filed on Sep. 19, 2006.

(30) Foreign Application Priority Data

Sep. 20, 2005 (JP) ............................. 2005-272379
Mar. 29, 2006 (JP) ............................. 2006-092559

(51) Int. Cl.
*G06F 15/00* (2006.01)
*G06F 3/12* (2006.01)
*G06K 1/00* (2006.01)

(52) U.S. Cl. .................................... 358/1.15; 358/1.13

(58) Field of Classification Search ............... 358/1.15, 358/1.1, 1.6, 1.13, 1.14, 1.16; 710/62, 7, 710/19, 33, 61, 20

See application file for complete search history.

(56) References Cited

U.S. PATENT DOCUMENTS 5,892,955 A    4/1999  Ofer
7,742,074 B2 * 6/2010  Minatogawa ............. 348/207.1

2002/0178304 A1  11/2002  Camara et al.
2002/0191079 A1  12/2002  Kobayashi et al.

(Continued)

FOREIGN PATENT DOCUMENTS

JP        H05-216592 A      8/1993

(Continued)

OTHER PUBLICATIONS

Japan Patent Office; Notification of Reason for Refusal in Japanese Patent Application No. 2005-272379 mailed Jan. 2, 2005.

(Continued)

*Primary Examiner*—Douglas Q Tran
(74) *Attorney, Agent, or Firm*—Baker Botts L.L.P.

(57) ABSTRACT

A communications system including a host device and a peripheral device connected to the host device, wherein the host device issues commands to the peripheral device and the peripheral device executes data processing and replies to the host device, and wherein the peripheral device includes an image processing unit, a storage device a selection operating unit, and a trigger generating unit, wherein the host device transmits a first command to the peripheral device, the peripheral device transmits response information, the host device judges whether a trigger is generated in the peripheral device and transmits a second command requesting the peripheral device to transmit identification information the peripheral device transmits the response information to the host device, the host device instructs the peripheral device to read the image data from the storage device to transmit to the host device and stores the image data in a predetermined storage area thereof.

18 Claims, 16 Drawing Sheets

U.S. PATENT DOCUMENTS

| | | | |
|---|---|---|---|
| 2004/0136224 A1 | 7/2004 | Hamer et al. | |
| 2005/0023339 A1 | 2/2005 | Uno | |
| 2005/0243362 A1* | 11/2005 | Sakuda et al. | 358/1.15 |
| 2005/0289260 A1 | 12/2005 | Hamer et al. | |

FOREIGN PATENT DOCUMENTS

| | | | |
|---|---|---|---|
| JP | 2000-227868 A | 8/2000 |
| JP | 2002-049534 A | 2/2002 |
| JP | 2002-077690 A | 3/2002 |
| JP | 2002-109528 A | 4/2002 |
| JP | 2002-222158 A | 8/2002 |
| JP | 2002-320117 A | 10/2002 |
| JP | 2004-215164 A | 7/2004 |
| JP | 2005018645 A2 | 1/2005 |
| JP | 2005-050192 A | 2/2005 |
| JP | 2005107875 A | 4/2005 |
| JP | 2005210529 A | 8/2005 |
| JP | 2005-538455 T | 12/2005 |

OTHER PUBLICATIONS

Japan Patent Office; Notice of Reason for Refusal in Japanese Patent Application No. 2006-092560 mailed Feb. 18, 2010.

European Search Report, dated Feb. 4, 2007.

T10/1416-D Revision 23, dated May 4, 2005 dpANS SCSI Primary Commands-3 (SPC-3).

Japan Patent Office; Notification of Reason for Refusal in Japanese Patent Application No. 2005-272379 mailed Jan. 5, 2010.

Hiroshi Suzuki; "Principle of SCSI and Utilization Technique in MS-DOS & Unix"; INTERFACE CQ Publishing Co., LLTD., Jan. 1, 1993, vol. 19 No. 1 pp. 88-119.

* cited by examiner

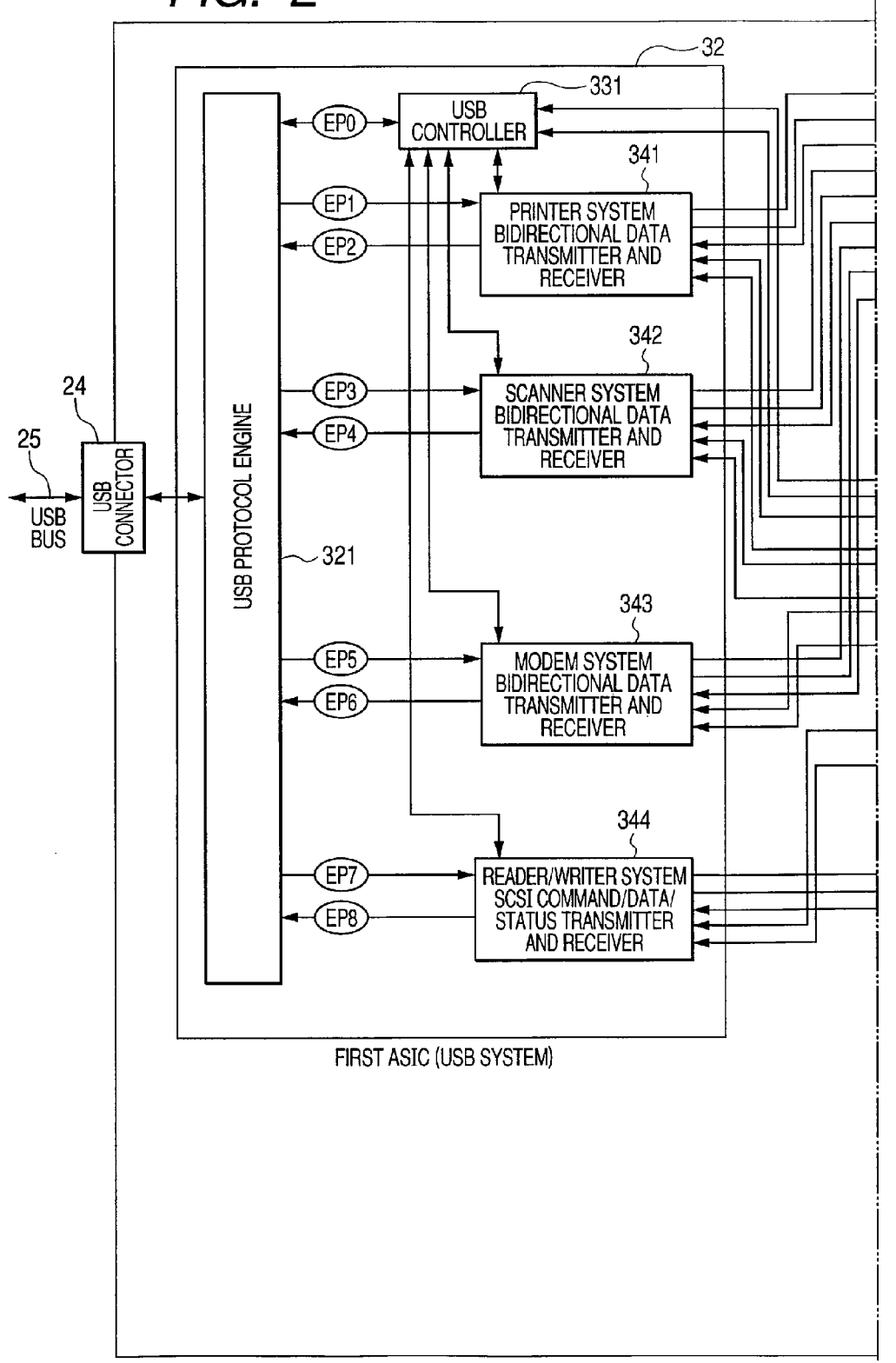

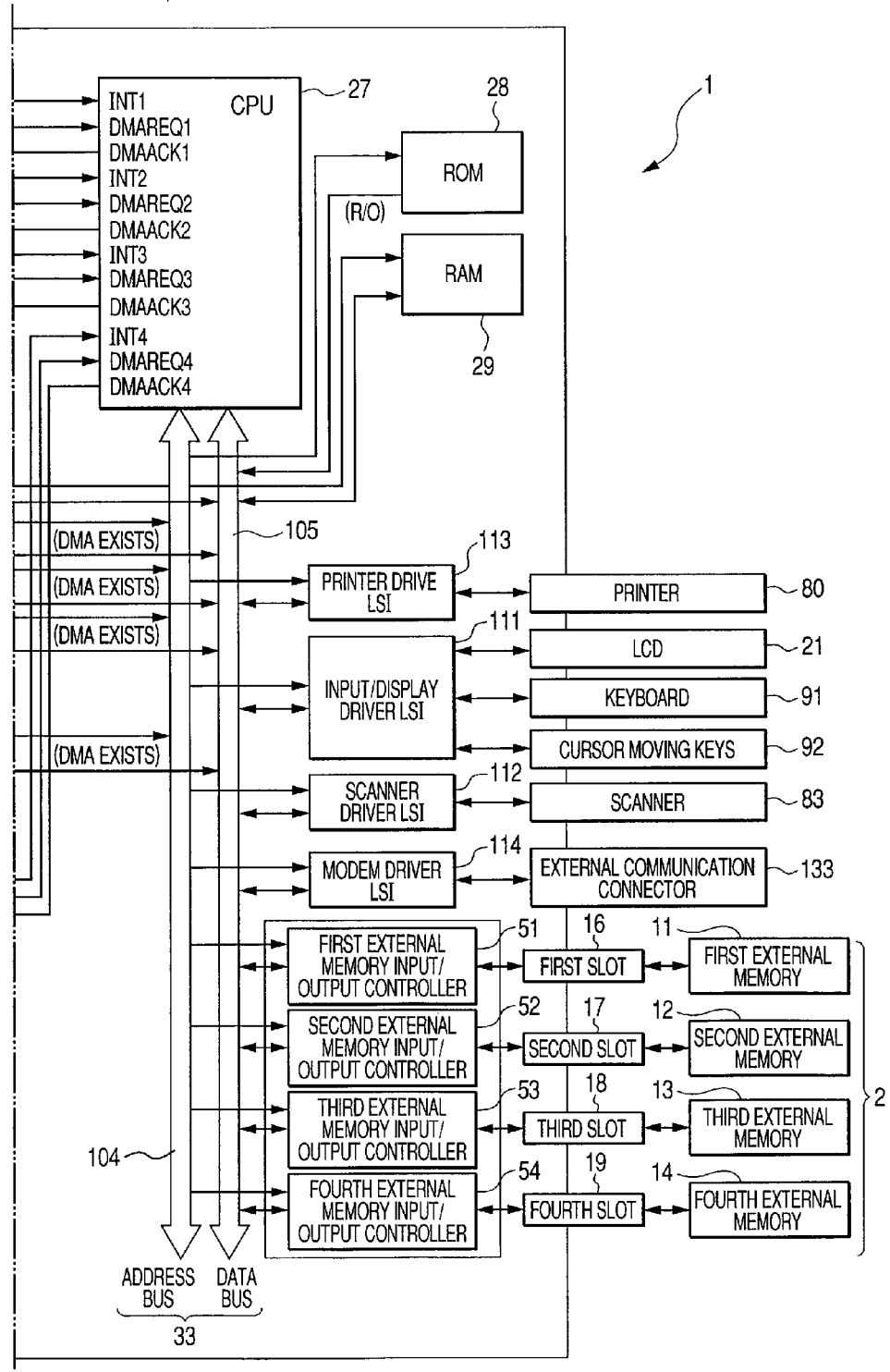

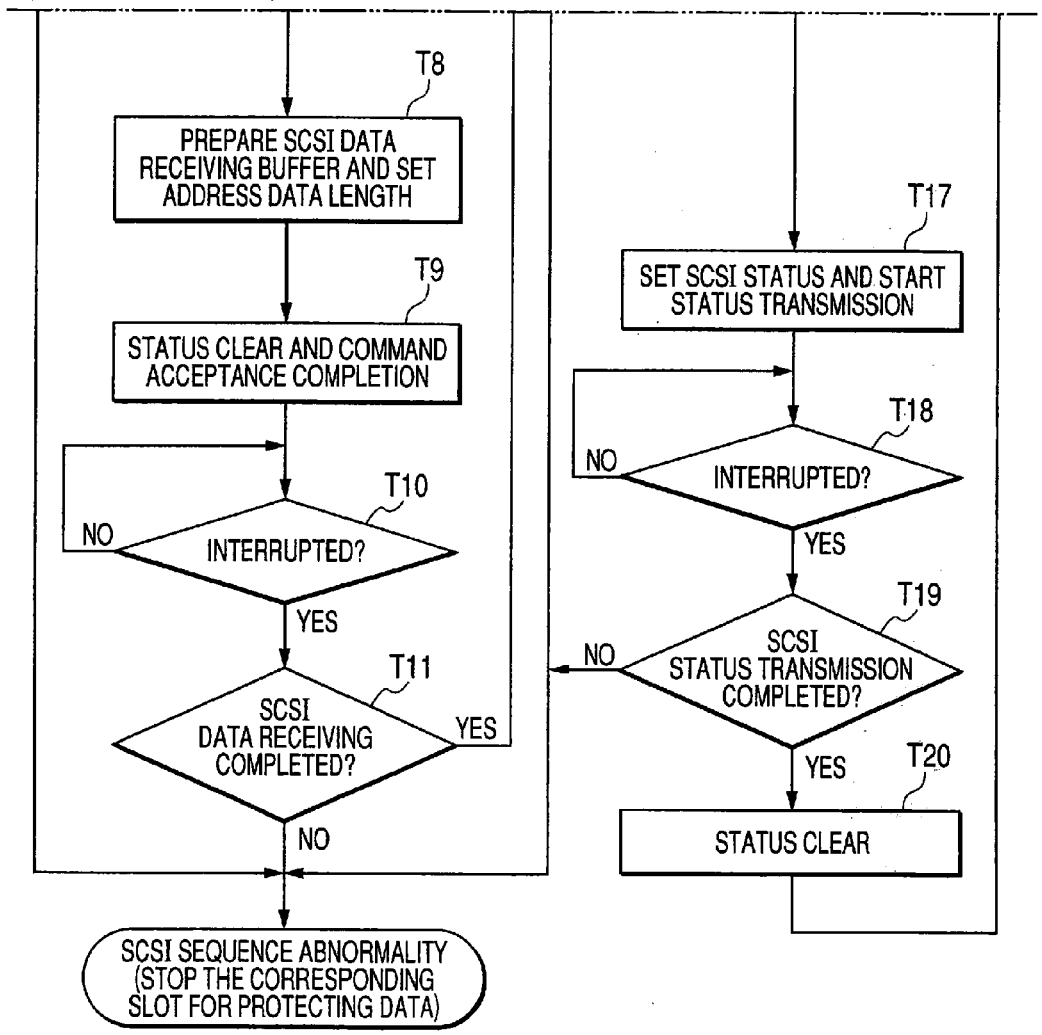

COMMUNICATION SYSTEM, INFORMATION PROCESSING DEVICE, PERIPHERAL DEVICE AND COMMUNICATION METHOD

CROSS-REFERENCE TO RELATED APPLICATIONS

This application is a continuation-in-part of co-pending U.S. patent application Ser. No. 11/533,078 filed on Sep. 19, 2006, which is based upon and claims the benefit of priority from Japanese Patent Application No. 2005-272379 filed on Sep. 20, 2005, the entire contents of which are incorporated herein by reference. This application claims priority from Japanese Patent Application No. 2005-272379, filed Sep. 20, 2005, and Japanese Patent Application No. 2006-092559, filed Mar. 3, 2006, the entire subject matter of which are incorporated herein by reference.

TECHNICAL FIELD

Aspects of the present invention relate to a communications system including a personal computer or a workstation as a host device and a peripheral device connected to the host device, and a peripheral device to be used in the communications system.

BACKGROUND

Recently, a so-called memory card (an example of recording media) formed by packaging a nonvolatile memory such as a flash memory in a card form is widely known. Memory cards are rapidly spread as data storage media to be used in digital devices such as digital cameras and portable music players. The specifications of the memory cards are not standardized, and for example, various memory cards such as a compact flash (registered trademark, hereinafter, abbreviated to "CF"), smart media (registered trademark, hereinafter, abbreviated to "SM"), a memory stick (registered trademark, hereinafter, abbreviated to "MS"), and an SD memory card (registered trademark, hereinafter, abbreviated to "SD") are available on the market.

A PC, etc., can access the memory card by using a memory card reader/writer (an example of the peripheral device, hereinafter, abbreviated to "reader/writer") for reading from and writing on the memory card connected to the PC, etc. Thereby, data communications can be made between the PC and the memory card. As such a reader/writer, U.S. Patent Application Publication 2005/0023339 A1 discloses a single slot type having one slot in which a memory card is inserted, and a multi-slot type having a plurality of slots capable of reading and writing data from and on a plurality of memory cards.

It has become common that the above-described reader/writer performs data transfer between the reader/writer and the PC by serial communication from the background that data transfer capacity has dramatically increased due to the spread of multimedia. However, for control of data access, there are many devices using the method same as arbitration/access control of peripheral devices for parallel communication because of the easiness in handling of a plurality of storage media. As a typical example, there is a system designed so as to make data communication between a PC and a reader/writer based on a protocol defined by so-called SCSI standards (hereinafter, also referred to as SCSI protocol). The SCSI standards were a communication protocol standardized by ANSI (American National Standard Institute) and internationally accepted. This protocol can increase the generality of the PC and the reader/writer, so that it is widely used. In the description given below, SCSI standards indicate SCSI-2, basically.

In the SCSI protocol, a PC as a host device functions as an initiator provided with authority to start a communication event, and a peripheral device is determined as a target that is a communication target of the host device. The PC successively issues commands for commanding execution of a communication event to the peripheral device. On the other hand, the peripheral device which received the issued commands successively executes processing corresponding to the commands (for example, data reading, writing, erasing, and various accompanying processing), and replies with response information in accordance with the results of execution to the host device side. Then, the issuing direction of commands for administering the execution of the communication event is regulated to one direction from the host device side to the peripheral device side.

As described above, although the SCSI communication is bidirectional communication between a PC and a peripheral device, the issuing direction of commands for administering a communication event is regulated to one direction from the PC side to the peripheral device side as described above, and the PC side as an initiator always seizes the initiative with the communication processing start. That is, when following the SCSI protocol, it is impossible to issue commands for starting a communication event from the peripheral device side to the host device side, and there was no method for voluntarily starting a specific communication event on the peripheral device side. For example, when the PC side reads an image data file stored in a memory card inserted in the reader/writer or the image data file is saved in a storage device on the PC side such as a hard disk drive (HDD), a user must always perform an operation for reading or writing on the PC side (that is, command execution input). Therefore, even if a memory card storing an image data file is inserted in a reader/writer disposed remote from a PC, when a user wants to save the image data file in the PC, the user cannot perform an operation for saving unless he/she goes to the PC location, and this is very inconvenient for the user.

Particularly, in recent years, printing devices equipped with such a reader/writer have also spread, and by inserting a memory card on which an image data file saved in the J-PEG format or the like is written in the reader/writer, it becomes possible to directly output and print an image without involving the PC. However, for the above-described reason, this printing device has not realized the function of saving the image data file in the memory card inserted in the reader/writer into the PC.

SUMMARY

According to an aspect of the present invention, there is provided a communications system comprising: a host device; a peripheral device connected to the host device to communicate with the host device according to a main communication protocol, the main communication protocol for regulating an issue of a command in one direction from the host device to the peripheral device; wherein the host device successively issues commands to the peripheral device; the peripheral device successively executes data processing based on the commands and replies with response information corresponding to results of the data processing to the host device; the peripheral device comprises an image processing unit, a storage device storing image data to be used in the image processing unit, the image data being accessible from the host device and the image processing unit, a selection operating unit that allows a selection operation of a user for selecting the image data, and a trigger generating unit that generates a trigger according to the selection operation; the host device transmits a first command to the peripheral device, the first command for requesting the peripheral device to transmit a trigger generation report information indicating whether the trigger is generated in the peripheral device; the peripheral device transmits the response information including the trigger generation report information to the host device according to the first command; the host device judges whether the trigger is generated in the peripheral device according to the trigger generation report information and transmits a second command for requesting the peripheral device to transmit an identification information of the image data corresponding to the selection operation to the host device, when it is judged that the trigger is generated in the peripheral device; the peripheral device transmits the response information including the identification information to the host device according to the second command; the host device instructs the peripheral device to read the image data from the storage device to transmit to the host device, according to the identification information, and stores the image data in a predetermined storage area thereof.

BRIEF DESCRIPTION OF THE DRAWINGS

In the accompanying drawings:

FIG. 2 is a block diagram showing an example of electrical construction of the multi reader/writer;

DETAILED DESCRIPTION

Figure 1A:
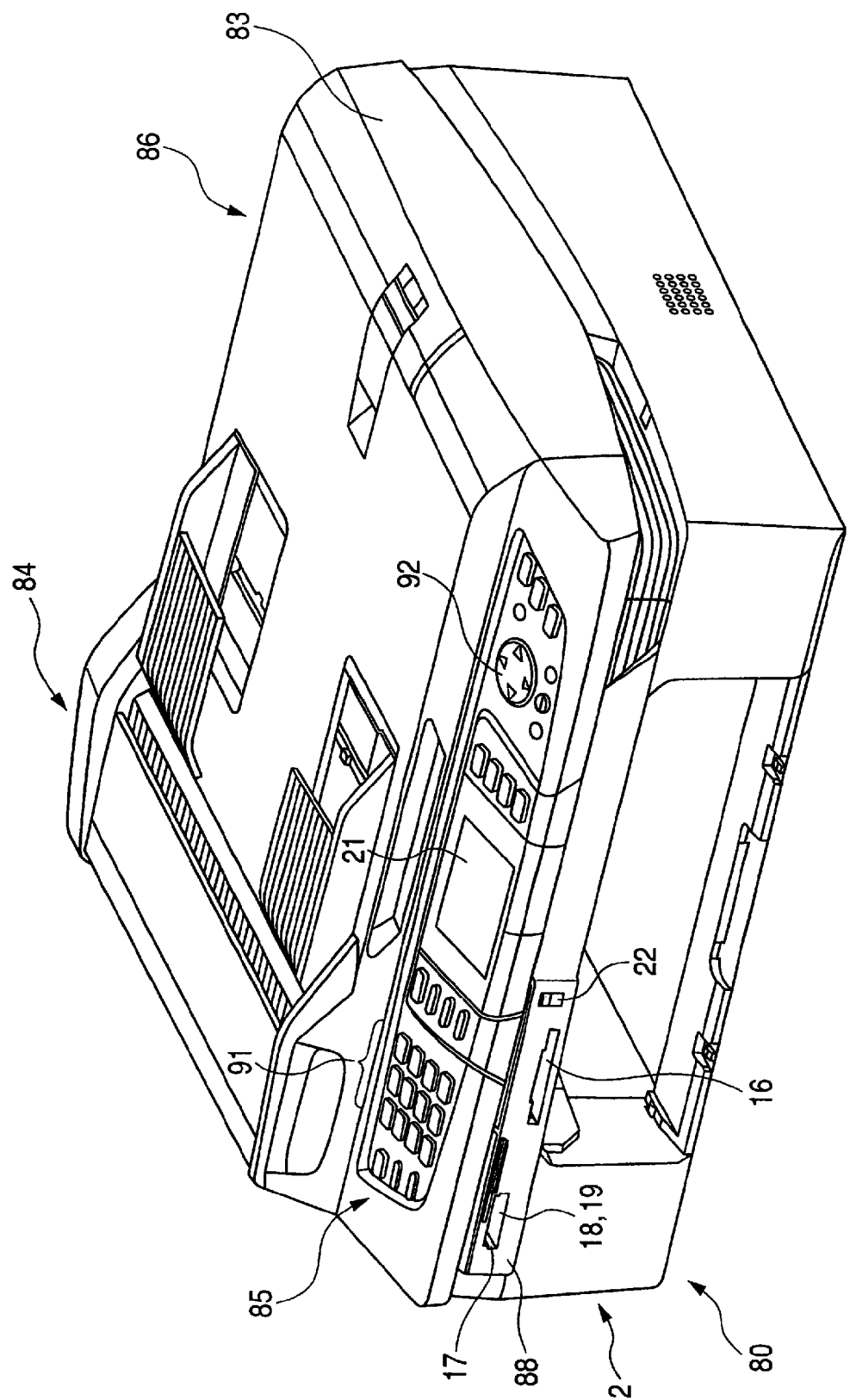
FIG. 1A is a perspective view showing an example of a printing device as an image processing device to be applied to the communications system of the present invention.

In the present invention, a peripheral device side trigger for urging the host device to start a target communication event is generated based on a user's operations, and on the host device side, a trigger report request command for monitoring generation of a peripheral device side trigger in the peripheral device is issued to the peripheral device according to a main communication protocol. Trigger generation report information from the peripheral device that received the trigger report request command is received by the host device side, and when it is judged that a peripheral device side trigger has been generated from the contents of the trigger generation report information, a target communication event is started. Thereby, it becomes possible to voluntarily start a specific communication event (on the host device side) by the user's operations on the peripheral device side although the issuing direction of commands for administrating communication event execution is regulated to one direction from the host device side to the peripheral device side.

In the present invention, the peripheral device is constructed as an image processing device including an image processor, a storage device in which a storage medium that stores image data files to be used by the image processor and enables at least data access for reading an image data file is detachably inserted, and is enabled both to access data in the storage medium from the host device side according to a communication event and to access data in the storage medium from the image processor side, and a file selection operating part for selecting an image data file in the storage medium. Then, an image data file selection and saving event is executed in which according to grasping of generation of a selection operating trigger by the file selection operating part as the peripheral device side trigger on the host device side based on trigger generation report information from the peripheral device, the peripheral device is requested to transmit selection contents of the image data file in a file list selected by the file selection operating part, and the image data file selection contents are received as response information from the peripheral device, and the selected image data file is read by the peripheral device and transmitted to the host device, and the image data file received from the peripheral device is saved in a predetermined storage area on a host device side storage device provided on the host device side. Thereby, processing for transmitting and saving the image data file in the storage medium to the host device side can be executed by the user's operations on the peripheral device side, and even if the peripheral device is connected remotely from the host device, the image data file saving processing can be performed by remote control from the peripheral device side.

As the main communication protocol, in the present invention, a SCSI protocol (any of SCSI-1, SCSI-2, and SCSI-3, more specifically, SCSI-2 which has been continuously used in many OS kernels) can be used, however, the main communication protocol is not intended to be limiting in any way.

In the peripheral device, a display part for displaying a file list of image data files that the storage medium stores and image data file name selection storage unit for storing a image data file name that the file selection operating part selects among the image data file name included in the file list displayed on the display part, can be provided. When the file selection operating part performs a selection determination operation, the image data file name stored in the image data file selection storage unit is transmitted as response information from the peripheral device to the host device. With this construction, when a storage medium storing image data files is inserted in the peripheral device disposed remote from the host device, on the peripheral device side, a user can easily select a desired image data file by the file selection operating part by referring to the displayed contents of the file list, and further transmit the selected image data file to the host device, so that even when the peripheral device is connected remotely from the host device, processing for saving the image data file on the host device side can be more easily performed by remote control from the peripheral device side.

The image processing device constituting the peripheral device may be constructed as a printing device including an image processor constructed as a printer. Thereby, differently from a conventional printing device that has only a function of outputting and printing image data in a storage medium inserted in a storage device, the printing device can realize a communication event for transmitting an image data file in the storage medium to the host device (PC) side and saving it in the storage device on the host device side without problems even under a main communication protocol having the above-described restriction.

Next, in the communications system of the present invention, the trigger report request command issuing unit can repeatedly and continuously issue a trigger report request command to the peripheral device at predetermined time intervals. By repeatedly and continuously issuing a trigger report request command, the host device can reliably acquire a peripheral device side trigger regardless of the timing of the generation of the peripheral device side trigger.

In the present invention, it is also possible that a communication interface (for example, IEEE 1394 or 1394b) following another protocol enabling peer-to-peer communication with the peripheral device is incorporated in the host device side, and the peripheral device is connected to a connector of the communication interface. In this hardware construction, the peripheral device can issue a command for communication processing to the communication interface (that is, the host device), so that shifting to a reference technical mode that does not belong to the present invention and omits the functions following the main communication protocol of the trigger report request command issuing unit (host device side) and the trigger generation report information replying unit (peripheral device side) is possible. However, this reference technical mode requires incorporation of a module which handles another protocol for enabling the peer-to-peer communication in the system of the host device side, and the cost of the communication interface is inevitably increased, so that this is not realistic.

On the other hand, in the present invention, the peripheral device and the host device are connected via a serial communication mechanism which is capable of polling the peripheral device from the host device side and is not capable of reverse-polling the host device from the peripheral device side so that information transfer between the host device and the peripheral device for executing a communication event is executed by serial communication in a form that the host device polls the peripheral device. In this construction, the peripheral device is not possible to poll the host device (that is, the peripheral device is not provided with authority to start communication), so that the effect of the present invention is made more effective, and also, the communication interface on the host device side for direct connection to the peripheral device is significantly simplified, so that the system construction is reduced in weight and cost. As standards of such serial communication, USB (Universal Serial Bus) can be illustrated. In this specification, the peripheral device using a SCSI protocol as the main communication protocol is called a USB/SCSI peripheral device, the peripheral connecting to the host device by a serial communication bus following the USB protocol.

When the USB is used, in detail, the peripheral device can be constructed as follows. That is, the peripheral device can be constructed so as to include an access control device for performing communication processing control for the peripheral device side by executing a command analysis step for analyzing contents of a command by receiving the command from the host device, a data processing step for executing data processing that reflects contents of the command analysis, and a response information replying step for replying with response information indicating the results of data processing to the host device in this order, and a serial communicating unit which executes mutual transfer of the command and response information by serial communication in a form that the host device polls a plurality of access control devices. The access control device includes a transmitter and receiver for transmitting and receiving commands and response information to and from the serial communicating unit, and a control executing entity for controlling and executing data processing according to contents of a command by interpreting the command. The transmitter and receiver and the serial communicating part can be integrated in an exclusive IC. In this construction, commands following the main communication protocol such as SCSI and response information can be exchanged without problems by serial communication following the USB protocol via a bus.

In detail, the serial communicating part on the peripheral device side includes a communication bus connection connector for connecting a serial communication bus from the host device, and a communication controller for executing transfer communication processing of commands and response information between the serial communication bus and the transmitter and receiver. Further the communication controller includes a protocol engine part for communication processing to be connected to the communication bus connection connector and a control instructing part which is connected to the protocol engine part via a bidirectional end point for controlling constituted by a FIFO memory and administers control of transfer communication processing. Then, the transmitter and receiver can be connected to the protocol engine part via an end point for inputting into the protocol engine part constituted by a FIFO memory and an end point for outputting from the protocol engine part constituted by a FIFO memory so that input and output paths are separated. The communication controller can be constructed so as to receive identification information of a transmitter and receiver as a data accessing target and identification information of an end point corresponding to the transmitter and receiver from the host device side and poll each of the transmitter and receiver as a target device. An end point that becomes a transmitting and receiving data buffer is independently provided on the transmission side and the receiving side, and the data transfer direction can be easily identified based on which end point is designated when polling.

Next, the communications system of the present invention can be provided with:

investigation instruction data creating unit provided on the host device side, for issuing an investigation request command for requesting the peripheral device to perform investigation report processing for the peripheral device itself, and creating investigation instruction data having a predetermined frame format that indicates investigation report instruction contents and including additional information written into a predetermined field of the frame, and investigation instruction data transmitting unit for transmitting the created investigation instruction data to the peripheral device;

investigation report data generating unit provided in the peripheral device, for generating investigation report data having a predetermined frame format in response to the investigation instruction data;

investigation report data transmitting unit provided in the peripheral device, for transmitting investigation report data as response information to the host device; and additional information extracting unit provided on the peripheral device side, for extracting additional information from the predetermined field of the received investigation instruction data.

In the present invention, the main purpose of the main communication protocol is to transmit and receive an image data file to and from a storage device constituting the peripheral device, and information concerning control processing that the main communication protocol does not support (in particular, processing for starting a communication event on the peripheral device side) must be handled as additional information independent from control information that the main communication protocol supports. It is meaningless that such additional information is written on the main body of the image data file as a transmitting/receiving target. The reason for this is that when the host device side or the peripheral device side attempts to refer to the contents of additional information for control execution, it becomes necessary to start application software for opening the image data file, and this is not realistic at all. However, in the above-described construction, by writing additional information desired to be transmitted from the host device side to the peripheral device side in a predetermined field of investigation instruction data created according to issue of an investigation request command in a manner using an investigation request event for requesting the peripheral device to perform investigation report processing for the peripheral device itself, the additional information can be reliably transmitted under control by the main communication protocol without involving the image data file.

The investigation report data generating unit can write corresponding additional information corresponding to additional information from the host device side on a predetermined frame of investigation report data, and the investigation report data transmitting unit can transmit investigation report data in which the corresponding additional information was written as response information to the host device. Thereby, corresponding additional information desired to be transmitted from the peripheral device to the host device side is written on a predetermined field of investigation report data as response information in response to the investigation request command, whereby the information can be reliably transmitted under control by the main communication protocol without involving the image data.

In detail, as the above-described trigger report request command, an investigation request command can be used. In this case, peripheral device side trigger generation report instruction information is written as additional information in the investigation instruction data, and trigger generation report information is written as corresponding additional information in corresponding investigation report data. Thereby, a peripheral device side trigger generation report instruction can be accurately conveyed to the peripheral device side, and a peripheral device side trigger on the peripheral device side can be reliably grasped from the trigger generation report information in the investigation report data.

The investigation instruction data creating unit can write generation report instruction information in a field regulated in a main communication protocol to store information other than generation report instruction information as main stored information to be stored in the investigation instruction data in a manner that the generation report instruction information is commonly used as the main stored information. When the main communication protocol follows existing communication standards like a SCSI protocol, a frame of the investigation instruction data may have no space for newly setting a field exclusive for (trigger) generation report instruction information as a technical idea that arises for the first time in the present invention. In this case, in a field that was prepared for main stored information completely different from generation report instruction information as described above, (additional information including) generation report instruction information is written in a manner that it is commonly used as the main stored information, whereby the generation report instruction information can be written without problems even when there is no space for providing an exclusive field as described above.

For example, when the peripheral device is constructed as a storage device which a storage medium enabling at least data access for reading data is incorporated or detachably inserted in and accesses data in the storage medium according to a communication event, in the investigation instruction data, when executing a communication event relating to reading or writing of data from and on the storage medium according to a main communication protocol, a field for setting an allocation length of a memory area on the storage medium to be allocated to the reading or writing can be secured as an allocation length setting field. In this case, in this allocation length setting field, allocation length information is used as main stored information and generation report instruction information to be commonly used as the allocation length information can be written. Thereby, it becomes possible to transmit unique additional information that is not regulated in the main communication protocol to the peripheral device side so that this is commonly used as the allocation length information, and peripheral device side trigger generation report instruction information can be transmitted to the peripheral device side without problems.

In the main communication protocol, when the size of the allocation length setting field is determined to be a fixed bit length, to form a free space for writing the additional information in the allocation length setting field, the following skillful method is available. That is, the number of bits expressing a settable maximum value of allocation length by byte is set to be less than a total number of bits of the allocation length setting field. When an allocation length exceeding the maximum value is described in the allocation length setting field, regardless of the described allocation length value, the maximum value is determined as an actual set value of the allocation length. Then, uniquely corresponding to the redundant allocation length description value exceeding the maximum value, different additional information contents including generation report instruction information can be defined. For example, when CDB of an Inquiry command described later in a SCSI protocol is used as investigation instruction data, this CDB consisting of only fields allocated to SCSI protocol control, seems to have no space for writing new data by a user. However, in a setting field for an allocation length that is basically main stored information of the SCSI protocol, by setting a settable maximum value of the allocation length to be less than a total number of bits of the allocation length setting field as described above, a setting description value of a redundant allocation length exceeding this maximum value can be given new meaning as additional information including generation report instruction information.

Next, in the case of the SCSI protocol, several kinds of investigation request commands may be prepared. In this case, it may become an issue what kind of investigation request command is used as the trigger report request command. For example, when the peripheral device is constructed as a storage device which a storage medium enabling data access for both reading and writing data is detachably inserted in and accesses data in the storage medium according to a communication event, the peripheral device may include exchange notifying information holding unit for holding exchange notifying information for notifying the host device of exchange of the storage medium when the storage medium is exchanged, and exchange notifying information holding control unit for clearing exchange notifying information held in the exchange notifying information holding unit after executing a predetermined type-1 command when receiving the type-1 command from the host device, and reserving an exchange notifying information holding state of the exchange notifying information holding unit even after executing a type-2 command when similarly receiving the type-2 command other than the type-1 command. In this case, as an investigation request command to be used as the trigger report request command, it is strongly recommended to use the type-2 command. The reason for this is that when the type-1 command is used for this purpose, regardless of a trigger report request event that does not need exchange notifying information, the exchange notifying information is cleared when the processing is finished, and a system component (for example, file system) that basically needs this exchange notifying information on the host device side cannot acquire this exchange notifying information and may cause trouble that the contents stored in the storage medium are destroyed.

As the investigation request command, a construction/attribute investigation request command for instructing the peripheral device to report construction/attribute identification information for identifying the construction and attribute of the peripheral device itself can be used. In many cases, a communication event relating to such identification of the construction and attribute of the peripheral device itself is used on the main communication protocol for recognizing, for example, what kind of peripheral device (target when device is SCSI) is connected when the device starts, however, in the present invention, this communication event is repeatedly issued at predetermined timings even after the device starts to monitor generation of a peripheral device side trigger in the peripheral device. The communication event which is regulated by the construction/attribute investigation request command basically aims at only recognition of a so-called "feature" of the peripheral device, and for example, when the storage medium is exchanged before or after a command is generated, the communication event should not have undesirable influences on the exchange notifying information holding state, so that it is desirable that the communication event is prepared as the type-2 command. By diverting this to monitoring of generation of a peripheral device side trigger, repeated issuing of said command has no influence on the exchange notifying information holding state, so that the above-described trouble can be prevented.

When the main communication protocol is a SCSI protocol, it is desirable to use an Inquiry (reference) command as the investigation request command. In this case, investigation instruction data to be transmitted from the host device (initiator) to the peripheral device (target) is CDB (Command Descriptor Block, having a frame format regulated in detail for each command in the SCSI protocol) describing the detailed contents of the Inquiry command, and investigation report data to be replied from the peripheral device (target) to the host device (initiator) is Inquiry data (having a frame formal regulated in detail in the SCSI protocol). Table 1 shows the CDB format corresponding to the Inquiry command.

TABLE 1

| Byte | Bit | | | | | | | |
|---|---|---|---|---|---|---|---|---|
| | 7 | 6 | 5 | 4 | 3 | 2 | 1 | 0 |
| 0 | | | | 12h (operation code) | | | | |
| 1 | LUN | | | Reserved | | | | EVPD |
| 2 | Page code | | | | | | | |
| 3 | Reserved | | | | | | | |
| 4 | Allocation length | | | | | | | |
| 5 | Control byte | | | | | | | |

In the SCSI protocol, the kind of Inquiry data to be replied from the peripheral device (target) can be designated on the host device (initiator) side. In detail, in the CDB corresponding to the Inquiry command, a field (1 bit) called EVPD (Enable Vital Product Data) and a field called page codes (8 bits) are formed. As shown in Table 2, to the CDB describing "0" in the EVPD field (hereinafter, abbreviated to CDB(0)), as Inquiry data, standard Inquiry data (hereinafter, referred to as S/I data) whose format and contents are commonly determined regardless of the specifications of the peripheral device is replied. In the S/I data, a free space which is not directly used for communication control according to the SCSI protocol can be used as a description field of response information unique to the present invention (hereinafter, referred to as unique response information) such as trigger generation report information.

TABLE 2

| CDB(0) (EVPD = 0) | | |
|---|---|---|
| Byte | Data | Remarks |
| 0 | 0x12 | Inquiry code number |
| 1 | 0x00 | SCSI-LUN, EVPD = 0 |
| 2 | 0x00 | Fixed to 0 when EVPD = 0 |
| 3 | 0x00 | Reserve (fixed to 0) |
| 4 | nn | Allocation length (allocation length area) |
| 5 | 0x00 | Control byte (fixed to 0) |

TABLE 3

| Standard Inquiry data | | |
|---|---|---|
| Byte | Data | Remarks |
| 0 | 0x00 | Direct access device |
| 1 | 0x80 | Interchangeable storage medium |
| 2 | 0x02 | SCSI-2 |
| 3 | 0x02 | SCSI-2 |
| 4 | 0x5B | 95 bytes exist |
| 5 | 0x00 | System reservation (fixed to 0) |
| 6 | 0x00 | System reservation (fixed to 0) |
| 7 | 0x00 | Various flags |
| 8–15 | | Vendor ID (for example, ASCII code indicating manufacturer) |
| 16–31 | | Product ID (for example, ASCII code indicating model name) |
| 32–35 | | Product version number (for example, ASCII code indicating version) |
| 36–55 | | Unique to vendor |
| 54 | | Higher 4 bits: Physical I/F information (0 = no information, 1 = USB, 2 = SCSI, 3 = IDE) Lower 4 bits: LUN information (USB-LUN in the case of USB, SCSI-LUN in the case of SCSI or IDE) |
| 55 | | Higher 4 bits: USB multi function device information (0 = no information, 1 = USB single function, 2 = USB multi function device) Lower 4 bits: indicates multi I/F number in |

TABLE 3-continued

Standard Inquiry data

| Byte | Data | Remarks |
|---|---|---|
| 56–95 | 0x00 | the case of USB multi function device System reservation (fixed to 0) |

For example, in the S/I data, a field with a fixed length for describing information unique to a vendor of the device (hereinafter, referred to as vendor unique area) is provided, and when this field has a free space, this free space can be used as a describing field for response information unique to the present invention. The following free space can also be used as the describing field for response information unique to the present invention although its number of bits is small. That is, a maximum data length of an additional data length field set to 8 bits (data length after the byte 5 of S/I data) may be less than 8 bits due to an upper limit of the data frame length in the S/I data. In this case, when a data length exceeding this maximum data length is designated in the additional data length field, the maximum data length is designated regardless of the contents of the additional data length field. As a result, the range of bits exceeding the maximum data length can be substantially utilized as "free space" for describing unique response information.

On the other hand, as shown in Table 4, to CDB describing "1" in the EVPD field (hereinafter, abbreviated to CDB(1)), special Inquiry data called VPD (Vital Product Data) as shown in Table 5 for providing more detailed or device unique information is replied by the host device (initiator).

TABLE 4

CDB(1) (EVPD = 0)

| Byte | Data | Remarks |
|---|---|---|
| 0 | 0x12 | Inquiry code number |
| 1 | 0x00 | SCSI-LUN, EVPD = 1 |
| 2 | 0x00 | Page code when EVPD = 1 |
| 3 | 0x00 | Reserve (fixed to 0) |
| 4 | nn | Allocation length |
| 5 | 0x00 | Control byte (fixed to 0) |

TABLE 5

VPD (Inquiry data)

| Byte | Bit | | | | | | | |
|---|---|---|---|---|---|---|---|---|
| | 7 | 6 | 5 | 4 | 3 | 2 | 1 | 0 |
| 0 | Qualifier | | | Device type code | | | | |
| 1 | Page code | | | | | | | |
| 2 | Reserved | | | | | | | |
| 3 | Page length (n − 3) | | | | | | | |
| 4 | VPD information (unique to each page) | | | | | | | |
| . | | | | | | | | |
| . | | | | | | | | |
| . | | | | | | | | |
| n | | | | | | | | |

There are several kinds of regulated VPD, and it is described in the page code field of the CDB which kind of VPD is designated (in detail, page code list (page code: $00_h$) FRU ASCII information (page code: $01_h$ to $7F_h$), unit serial number (page code: $80_h$), operation mode definition (page code: $81_h$), ASCII operation mode definition (page code: $82_h$), and vendor unique format (page code: $C0_h$ to $FF_h$)) The peripheral device creates a VDP of the kind designated in the page code field, and replies with this data to the host device. Particularly, for the VPD in the FRU ASCII information format and ASCII operation mode definition format, a field with a data length for writing necessary ASCII information and an ASCII information field designated by this data length are formed next to the page length field, however, a field after these can be utilized as "free space" for describing unique response information as a vendor unique area. For example, in the VPD in the ASCII operation mode definition format, by defining the ASCII information field as a field with a small number of bytes (for example, 1 to 3 bytes) for describing device version information, the length for remaining fields which becomes the vendor unique area can be made comparatively large, and unique response information with a somewhat large size can be written herein.

In the SCSI protocol, when a change in phenomenon or state on the target (peripheral device) or one or a plurality of logical units included in the target (when the peripheral device is a storage device, one or a plurality of storage medium inserting slots) occurs out of synchronization with the operation of the host device (initiator), a function for generating a unit attention condition for notifying the initiator of this event or change is provided. When the storage medium is exchanged in the peripheral device, exchange notifying information is reflected on the generated unit attention condition. In the SCSI protocol, when an Inquiry command is issued to the peripheral device reserving such a unit attention condition, without clearing the unit attention condition being reserved (only before generating a Copy Aborted (CA) state), the peripheral device executes the issued Inquiry command (creation and reply of Inquiry data). Therefore, when starting a reply request event for requesting reply of unique response information such as trigger generation report information, by using the Inquiry command, even after the storage medium is exchanged, a unit attention condition including the exchange notifying information is held, and the exchange notifying information can be prevented from being lost. It is obvious that the Inquiry command corresponds to the above-described type-2 command.

In the SCSI protocol, another investigation request command called Request Sense command can also be used. The Request Sense command is a command for requesting the peripheral device (target) for sense data for reporting an error cause or kind, and as investigation report data, the sense data is described in a frame in a regulated format and replied. In the present invention, it is possible in principle that a free space of this sense data is used and unique response information such as trigger generation report information is written therein and replied to the host device. However, in the SCSI protocol, when a Request Sense command is issued to the peripheral device reserving the unit attention condition, the peripheral device is predetermined so as to clear the unit attention condition that the peripheral device is reserving (only before generating the Copy Aborted (CA) state), and when the storage medium is exchanged, the unit attention condition including the exchange notifying information may be cleared and the exchange notifying information may be lost. That is, the Request Sense command corresponds to the above-described type-1 command.

BEST MODE FOR CARRYING OUT THE INVENTION

Hereinafter, a communications system 1 according to an embodiment of the present invention will be described with reference to the drawings as appropriate. The construction of the communications system 1 described below is an example for embodying the present invention, and it is a matter of course that the present invention can be varied as appropriate without changing the gist of the present invention.

FIG. 1A shows an external appearance construction of a printing device 80 as an example of an image processing device (peripheral device) to be used in the communications system of the present invention. This printing device 80 is a so-called multi function device (MFD), and is constructed as a multifunction printer including a multi reader/writer 2 incorporated in a printer. In detail, the multifunction printer integrally includes a printer 80 (image processor) disposed at a lower portion of a casing, a scanner 83 provided above the printer, a document cover 86 having an ADF 84, an operation panel 85 disposed on the front side of the device upper face, and a multi reader/writer 2 disposed so that its slots are exposed to the device front face, and has a printer function, a scanner function, a copying function, and a facsimile function.

The printing device 80 is connected to a PC (see FIG. 6) described later and records images and documents on a recording paper by the printer 80 based on print data including image data and document data transmitting from the PC 3. Also based on the print data read from a memory card by the multi reader/writer 2, the printer 80 records images and documents on a recording paper. Furthermore, the printer is connected to the PC 3 and further functions as a reader/writer for data communication between the PC 3 and a memory card inserted in the multi reader/writer 2. It is also possible that image data read by the scanner 83 is transmitted to the PC 3 or an image read by the scanner 83 is recorded, that is, copied by the printer 80.

Figure 1B:
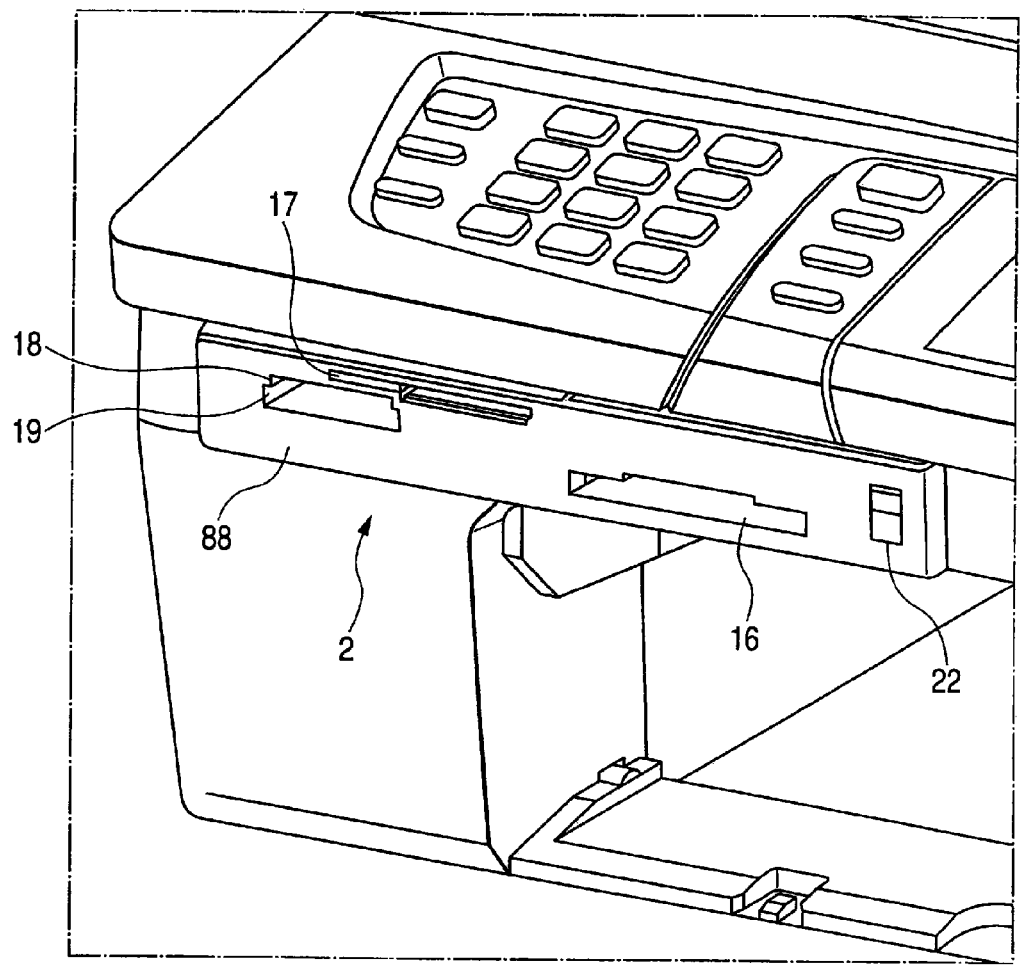
FIG. 1B is an enlarged view of the multi reader/writer of FIG. 1A.

The multi reader/writer 2 of the printing device 80 has, as shown in FIG. 1B, a first slot 16 for inserting a first memory card 1 (for example, CF), a second slot 17 for inserting a second memory card 12 (for example, SM), a third slot 18 for inserting a third memory card 13 (for example, MS), and a fourth slot 19 for inserting a fourth memory card (for example, SD). The multi reader/writer 2 is provided with a capture button 22 which is one of the manual operating parts on the casing front face on which the slots are arranged, and starts processing for saving an image data file (in, for example, the JPEG format) saved in the memory cards (storage media inserted in the respective slots) into a storage device such as a hard disk drive on the PC side. On the casing front face, a liquid crystal panel (LCD) 21 as a display part, a keyboard 91 including a numeric keypad, cursor moving keys 92 to be used for moving a cursor on the LCD 21, and the capture button 22 (described later) are provided.

The multi reader/writer 2 is constructed as a USB/SCSI peripheral device. In this embodiment, it is assumed that a SCSI-2 protocol is used as the main communication protocol. FIG. 2 is a block diagram showing electrical construction of the printing device 80. The multi reader/writer 2 includes, inside, a CPU 27 for controlling the respective components, a ROM 28 for storing control programs and various data, a RAM 29 as a work area for arithmetic operations by the CPU 27, and a USB chip 32, and these are connected to each other via the bus 33 including an address bus 104 and a data bus 105 so as to transfer data to each other. The multi reader/writer 2 performs data communication with the PC 3 to which the multi reader/writer 2 is connected according to the SCSI protocol.

In detail, in the ROM 28, a communication control program created based on the SCSI protocol and a table list of analysis data to be used for analyzing data (CDB) transmitted from the PC 3 are stored, and the CPU 27 performs execution control processing of a communication event corresponding to a received SCSI command for functioning of the reader/writer 2 as a target of a SCSI compliant device. The first through fourth memory cards 11 through 14 to be detachably inserted in the slots 16 through 19 are card type storage media enabling data access for data writing, rewriting, erasing, and reading, and media inserting confirmation from the PC 3, such as a compact flash (CF: registered trademark), smart media (SM: registered trademark), memory stick (MS: registered trademark), and SD memory card (SD: registered trademark).

In the printing device 80, a printer 80 is connected to the bus 33 linked to the CPU 27 via a printer driver LSI 113. In addition, a scanner 83 is similarly connected to the bus 33 via a scanner driver LSI 112. A modem 114 for facsimile transmission and receiving is connected to the bus 33, and an external communication connector 133 for connecting an external phone communication network or the like are connected to the modem 114. Furthermore, the above-described LCD 21, keyboard 91, and cursor moving keys 92 are linked via an input/display LSI 111.

In the ROM 28, a program for administering operation control of the printer 80, a program for administering operation control of the scanner 83, a program for administering facsimile communication control via the modem 114, a program for administering input control from the keyboard 91 or the cursor moving keys 92, and an operation control program for the multi reader/writer 2 are stored, and the CPU 27 totally control operations as the multifunction printer by executing these programs by using the RAM 29 as an execution area.

The printing device 80 is also provided with a USB connector 24, and the USB chip 32 is connected to this USB connector 24. To the USB connector 24, the PC 3 is connected via a USB cable.

The PC 3 has an authority to start a communication event as a host device according to the SCSI protocol, and the multi reader/writer 2 connected to the PC 3 (host device: initiator) becomes a communication target (target) of the PC 3 (host device). PC 3 (host device) successively issues SCSI commands for commanding execution of the communication event to the multi reader/writer 2 (peripheral device), and on the other hand, the multi reader/writer 2 (peripheral device) that received the issued commands successively execute data processing corresponding to the SCSI commands, and replies with response information corresponding to the results of execution to the host device side. The SCSI command issuing direction is regulated to one direction from the PC 3 (host device) side to the multi reader/writer 2 (peripheral device) side. The CPU 27 can access the memory card inserted in the multi reader/writer 2 independently from the PC 3. That is, both of the PC 3 and the CPU 27 constituting an image processor can access the memory card (in detail, eventually, access from the PC 3 is made by SCSI communication via the CPU 27).

Next, the printing device 80 (peripheral device) includes a function of peripheral device side trigger generating unit for selecting the image data file stored in the memory cards 11 through 14 and generating a peripheral device side trigger for urging the host device to start an image data file transmission and saving event for transmitting and saving the image data file into a storage device of the PC 3 side (the hard disk drive 44 (FIG. 6)) as a target communication event with predetermined contents based on the user's operations. This peripheral device side trigger generating unit selects an image data file that is a target to be saved in the PC 3 side among image data files in the memory cards 11 through 14 by using the keyboard 91 and the cursor moving keys 92 (as file selection operating part) and generates a selection operation trigger according to determination of the selection as clearly described below. The CPU 27 outputs this selection operation trigger as a trigger detection data signal. This trigger detection data signal is referred to when executing the Inquiry command described later, and written with the contents "trigger issued" in the Inquiry data which is created when the trigger detection data indicates a state of "trigger issued." That is, detection as to whether the button 22 (manual operating part) has been operated is made in response to an instruction from the PC 3. After creating the Inquiry data, the trigger detection data signal is reset.

Next, in the USB chip 32, for control of the multi reader/writer 2, a reader/writer system SCSI command/data/status transmitter and receiver (hereinafter, referred to as "transmitter and receiver," simply: transfer element transmitter and receiver) 344 provided commonly for external memory input/output controllers 51 through 54, a printer system bidirectional data transmitter and receiver 341 provided for controlling the printer 80, a scanner system bidirectional data transmitter and receiver 342 provided for controlling the scanner 83, a modem system bidirectional data transmitter and receiver 343 provided for controlling facsimile communication, a USB protocol engine (protocol engine part) 321 connected to the communication USB connector (communication bus connection connector) 24, and a USB controller (control instructing part) 331 for administering control of transfer communication processing are integrated. Thereby, the PC 3 recognizes the printer 801, the scanner 83, the modem 114, and the multi reader/writer 2 as USB target devices independent from each other.

Herein, the section constituted by the USB protocol engine (protocol engine part) 321 and the USB controller (control instructing part) 331 corresponds to the communication controller, and the section constituted by the communication controller and the USB connector (communication bus connection connector) 24 corresponds to the serial communication part.

The USB controller 331 is connected to a corresponding USB protocol engine 321 via a bidirectional end point for control constituted by a FIFO memory. The transmitter and receiver 344 is connected to the USB protocol engine 321 in a manner that input and output paths are separated via an input end point into the USB protocol engine 321 constituted by a FIFO memory and an output end point from the USB protocol engine 321 constituted by a FIFO memory.

The communication controller including the USB protocol engine 321 and the USB controller 331 receives identification information of the transmitter and receiver 344 as a target and identification information of an end point corresponding to the transmitter and receiver 344 from the PC 3 side, and identifies a data access destination set to the external memory input/output controllers 51 through 54 and a data transmission and receiving direction by polling each transmitter and receiver 344 as a target device. As a matter of course, reverse polling of the PC 3 as the host device from the transmitter and receiver 344 side as a target device is not permitted in the USB protocol.

The transmitter and receiver (transfer element transmitter and receiver) 344 performs transmission to and receiving from the USB protocol engine 321 according to the SCSI protocol. Herein, the transfer element includes a command (SCSI command) for specifying contents of the communication event and response information (status) replied from the peripheral device side in response to communication event processing execution which are exchanged with the PC 3 via the USB bus (when the processing contents specified by the SCSI command is data access processing relating to transmission or receiving of data stored in a memory card, this data is also included in the transfer element).

Figure 3:
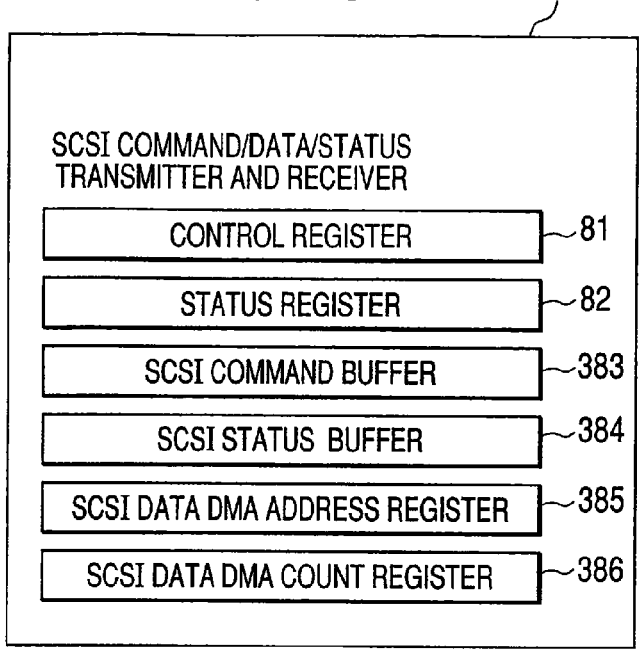
FIG. 3 is an explanatory view of a SCSI command/data/status transmitter and receiver of the multi reader/wrier.
Figure 4:
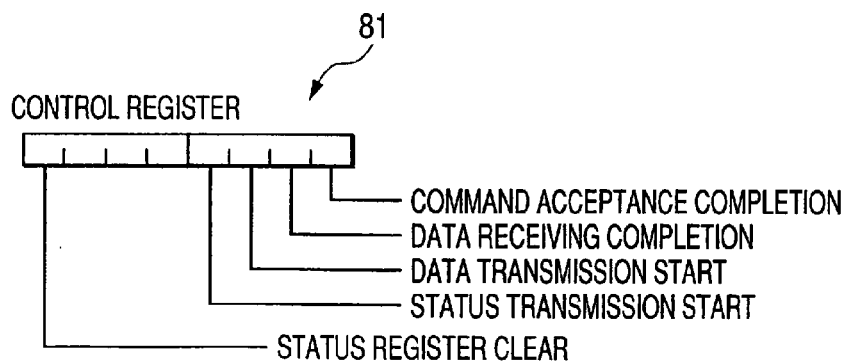
FIG. 4 is an explanatory view of a control register.
Figure 5:
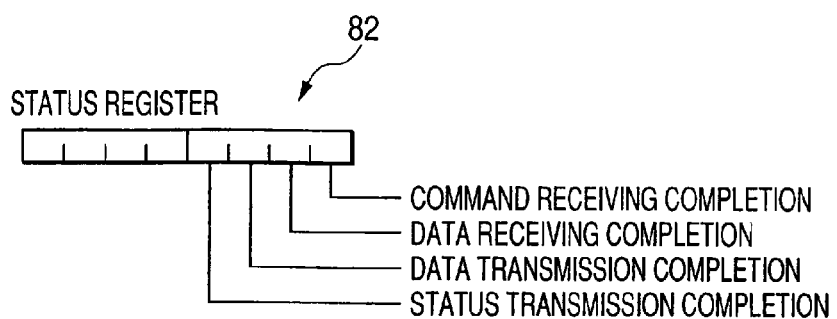
FIG. 5 is an explanatory view of a status register.

The transmitter and receiver 344 includes, as shown in FIG. 3, a control register 81 (see FIG. 4), a status register 82 (see FIG. 5), a SCSI command buffer 383, a SCSI status buffer 384, a SCSI data DMA address register 385, and a SCSI data DMA count register 386. Details of these will be described later.

The CPU 27 executes a command analysis step for analyzing a SCSI command that the transmitter and receiver 344 received, an event execution step for executing a communication event with contents specified by the SCSI command between the same and target external memory input/output controllers 51 through 54 (that is, when the reader/writer 2 is set as a target, a plurality of logical units included therein), and a status transmission step for making the transmitter and receiver 344 to transmit the status, in this order.

In the multi reader/writer 2, when reading or writing data from or on an inserted memory card, allocation of a memory area to be used for reading data from the memory card or a memory area to be used for storing data in the memory card is performed. A data length of this memory area to be allocated is called allocation length. Generally, the allocation length is set to data length designated from the PC 3 that accesses the multi reader/writer 2, however, in this embodiment, a maximum value of allocation length that can be set in the multi reader/writer 2 is set to be less than a maximum value that can be designated from the PC 3 side.

Figure 6:
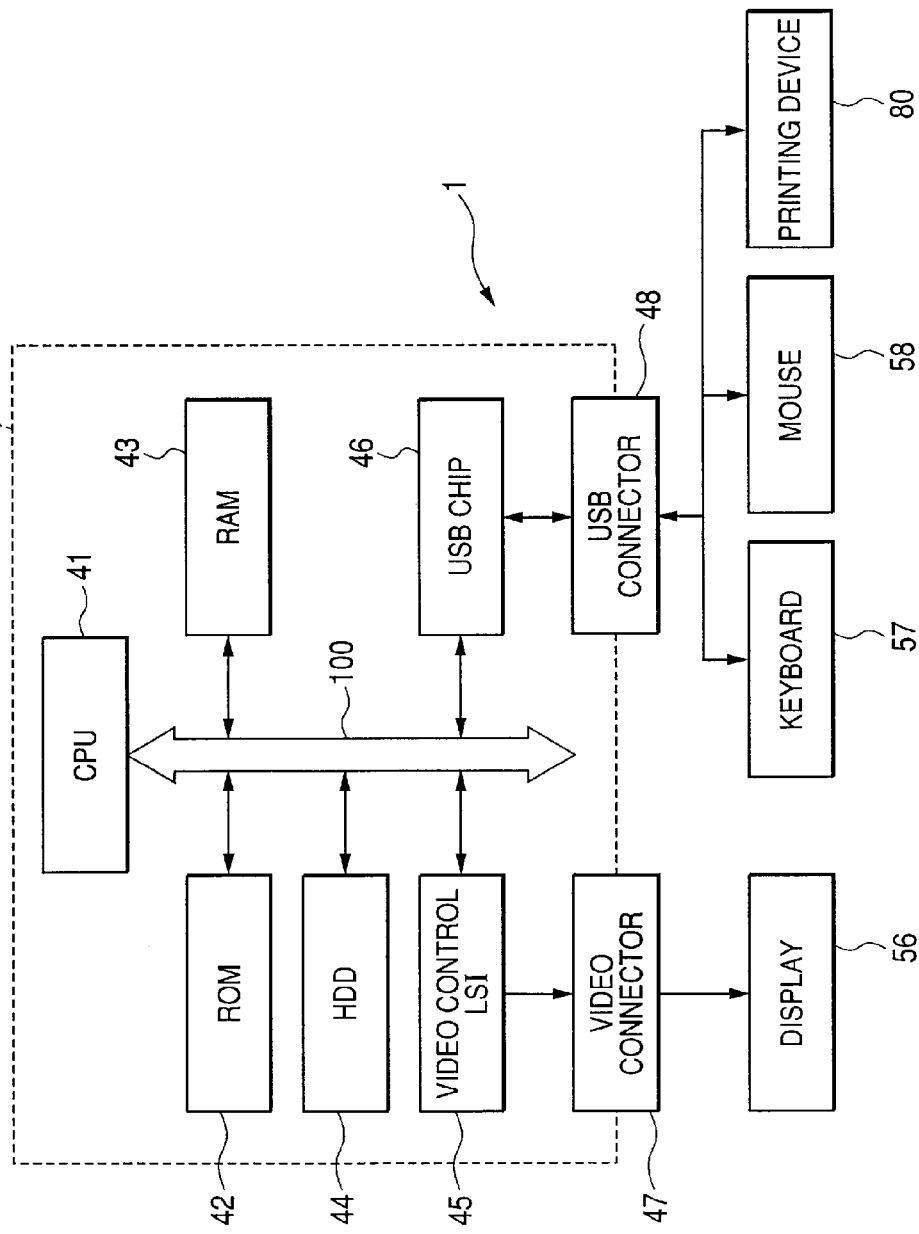
FIG. 6 is a block diagram showing an example of schematic construction of a PC to be applied to the communications system of the present invention.

The PC 3 includes, as shown in FIG. 6, a CPU 41 which controls the respective components, a ROM 42, a RAM 43, an HDD 44 storing various software programs and data, a video control LSI 45, a USB chip 46, a video connector 47, a USB connector 48 having a plurality of input/output ports, and so on, and these are connected to each other via a bus 100 so as to transfer data to each other. These parts are integrally incorporated in a main control board called a mother board. To the video connector 47, a display 56 is connected via a video cable. The USB connector 48 has a USB hub function. To this USB connector 48, input unit such as a keyboard 57 and a mouse 58, etc., are connected, and the printing device 80 is further connected.

In the ROM 42, instruction data which is data to be transmitted to the printing device 80 and makes the CPU 27 of the multi reader/writer 2 execute predetermined processing is stored. This instruction data is stored in the HDD 44 or the ROM 42 in a table-listed manner. In a program storage area in the HDD 44, software programs such as SP3 of Windows 2000 (registered trademark) (hereinafter, referred to as "WIN 2000") and a R/W application for enabling writing and reading of data on and from the multi reader/writer 2 are stored. By reading these software programs and performing predetermined arithmetic operations, the applications are enabled to operate in the PC 3. In the program storage area, a data communication program for data communication with the multi reader/writer 2 according to the SCSI protocol is stored. In this embodiment, a PC 3 in which the WIN 2000 is installed is illustrated, however, another OS such as the Linux Series or Mac OS series may be installed. Of course, it is also possible to replace the SP3 of Windows 2000 with SP4.

The R/W application, the data communication program on the PC 3 side, and the control program on the printing device 80 side perform processing for functionally realizing the following unit in conjunction with each other.

Trigger report request command issuing unit: functionally realized by the R/W application on the PC 3 (host device) side, and issues, to the printing device 80 (peripheral device), a trigger report request command for requesting for trigger generation report information as response information as an Inquiry command, specifically, Inquiry command using the above-described CDB (1) (hereinafter, referred to as Inq(1) command) according to a SCSI protocol (main communication protocol) to monitor a selection operation trigger as a peripheral device side trigger which is issued according to operation on a determination key of the printing device 80.

Trigger generation report information replying unit: functionally realized by the control program on the printing device 80 side, and replies with trigger generation report information reflecting generation of a peripheral device side trigger as response information to the PC 3 (host device) according to a SCSI protocol.

Report information receiving unit: functionally realized by the R/W application, and receives the trigger generation report information from the printing device 80.

Target communication event starting unit: functionally realized by the R/W application, and judges generation of a peripheral device side trigger based on contents of received trigger generation report information, and when it is judged that the peripheral device side trigger has been issued, starts a communication event for reading a target communication event, that is, in detail, an image data file stored in the memory cards 11 through 14 inserted in the reader/writer 2 and saving the image data file in a designated folder in the HDD 44 (FIG. 6) of the PC 3.

Figure 7:
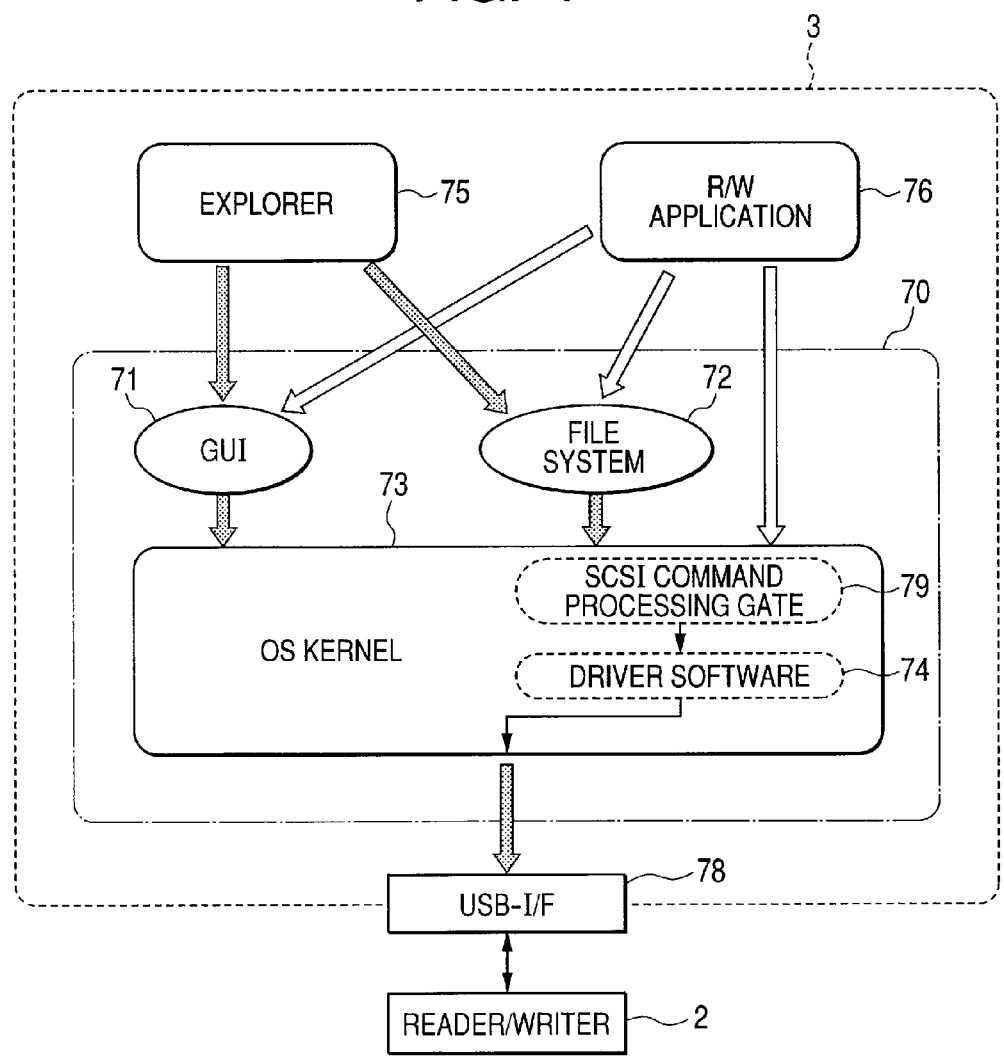
FIG. 7 is a schematic diagram for explaining an OS that operates on the PC and an application that operates on the OS.

First, data communication to be performed between the PC 3 and the reader/writer 2 of the printing device 80 USB-connected to the PC 3 via the USB-I/F 78 based on a SCSI command will be generally described with reference to FIG. 7. A core system of the OS 70 is configured by including a GUI (Graphical User Interface) 71, a file system 72, and an OS kernel 73. The GUI 71 is a user interface which realizes a user's input operations by using computer graphics and a pointing device such as a mouse, and a file system 72 is a management method for managing data by using files and folders in the computer and a management system for the same. The OS kernel 73 is software implemented with basic functions of monitoring applications and the peripheral device, etc. In the PC 3, driver software 74 is installed in advance so as to enable the computer to access the reader/writer 2, and the driver software 74 is implemented in the OS kernel 73 in a modularized manner.

For example, it is assumed that the explorer 75 that is an example of application for accessing the reader/writer 2 and the R/W application 76 start on the PC 3. The explorer 75 is, as generally known, for managing files and folders. The explorer 75 was created following the system of the OS 70, and it is recognized as one of the functions of the OS 70, generally. Therefore, the explorer 75 communicates with the reader/writer 2 via the file system 72. On the other hand, the R/W application 76 is unique application software developed by, for example, a manufacturer of the reader/writer 2, and performs processing for writing data on or reading data from a recording medium inserted in the reader/writer 2. Generally, the specifications of the file system 72 are not open to the public, so that the R/W application 76 is created without following the OS 70.

First, access from the explorer 75 to the reader/writer 2 will be described. When the OS 70 starts and the explorer 75 starts, an Inquiry command is issued to the OS kernel 73 by the explorer 75 via the file system 72. It is preset that all SCSI commands including Inquiry commands are issued to an SCSI command processing gate 79 virtually provided in the OS kernel 73. When the Inquiry command is issued, a corresponding CDB (herein, CDB(0): Table 2) is transmitted to the reader/writer 2, and the reader/writer 2 creates Inquiry data (in this case, S/I data (Table 3)) including construction information including the model and device name, SCSI-ID, possession of LUN (Logical Unit Number), and memory card type of the reader/writer and replies with this as response information to the PC 3. Thereby, the reader/writer 2 is recognized.

When the reader/writer 2 is recognized, the GUI 71 generates a drive icon of the reader/writer 2 on the explorer 75. Then, when a user inputs data reading instruction by accessing the drive icon by using a mouse or the like, the explorer 75 operates on the file system 72 and makes it issue a Read command (an example of SCSI commands) to the OS kernel 73. On the other hand, similarly, when the user inputs a writing instruction, a Write command (an example of SCSI commands) is issued to the OS kernel 73. These command data are transferred to the reader/writer 2 via an I/F such as a USB, and reading or writing according to the command is executed on the reader/writer 2 side. The Inquiry command is issued also when the reader/writer 2 is connected to the PC 3 or the power source of the PC 3 is reset while the reader/writer 2 is connected.

Next, access from the R/W application 76 to the reader/writer 2 will be described. When the R/W application 76 starts, a request for opening the data bus only to the R/W application is outputted to the OS kernel 73. The OS kernel 73 receives this request and makes the R/W application 76 to occupy the data bus. In other words, the SCSI command issued to the SCSI command processing gate 79 from the file system 72 is disabled to be accepted by the SCSI command processing gate 79. Therefore, during running of the R/W application 76, the file system 72 becomes unable to access the reader/writer 2. When the R/W application 76 is starts, an input screen (user interface screen) programmed by the R/W application 76 is displayed on the display by the GUI 71. In addition, an Inquiry command is issued to the OS kernel 73 by the driver software 74, and by reply of Inquiry data (in this case, S/I data in Table 3) as response information, construction information indicating the type and device name of the reader/writer 2 is acquired. Thereby, the reader/writer 2 is recognized. Thereafter, according to the Read command or Write command issued to the OS kernel 73 by the driver software 74, reading or writing of data is executed on the reader/writer 2 side.

The reader/writer 2 is recognized as follows. That is, first, CDB(0) (Table 2) generated when an Inquiry command is issued to the OS kernel 73 is transmitted to the reader/writer 2. The reader writer 2 side that received this CDB(0) refers to various information included in the CDB(0) and generates construction information according to said information and replies with S/I data (Table 3) including the construction information to the PC 3. Based on this replied S/I data, the reader/writer 2 is recognized.

When a memory card is exchanged (that is, a change in phenomenon or state) on any of the slots (or external memory input/output controller: logical unit) of the reader/writer 2 (target: peripheral device), a unit attention condition for notifying the PC 3 (initiator) of this exchange is generated. The file system of the PC 3 recognizes the memory card exchange by referring to the unit attention condition, and updates file information such as a FAT (file allocation table). When an Inquiry command is issued to a logical unit which is being reserved such a unit attention condition, this logical unit executes the Inquiry command without clearing the unit attention condition that the logical unit is reserving. That is, even when an Inquiry command is executed, memory card exchange notifying information reflected on the unit attention condition is not erased but held, so that the file system of the PC 3 can access the memory card after being exchanged without problems.

Figure 8:
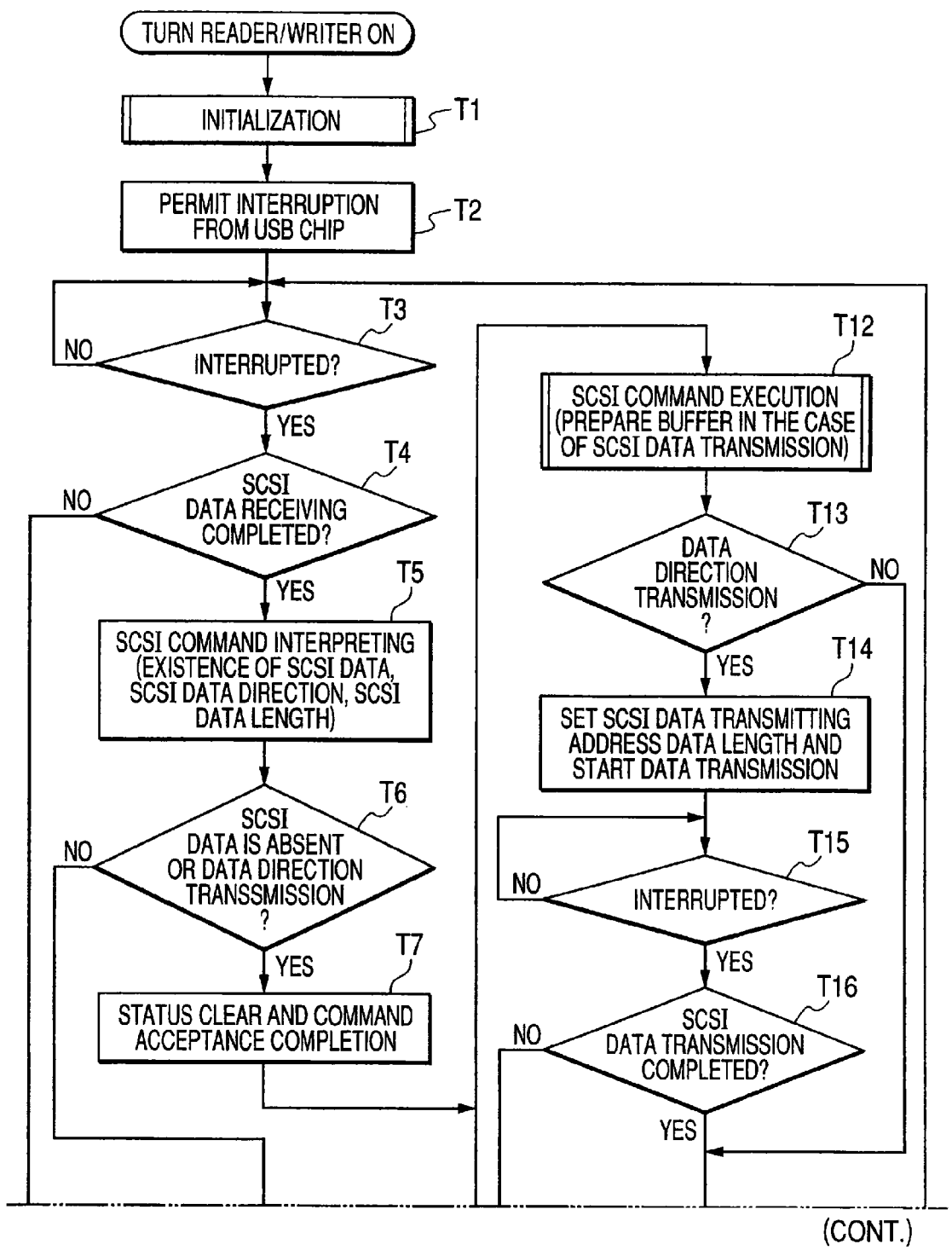
FIG. 8 is a flowchart showing flow of processing that the SCSI command/data/status transmitter and receiver of the multi reader/writer performs.

Next, detailed operations of the reader/writer 2 will be described with reference to the flowchart of FIG. 8. In the following description, only one slot is processed. For a plurality of slots, this processing is performed in parallel by unit of interruption. When the CPU 27 is turned ON by power (bus power) supplied from the PC 3 via the USB cable (T1), the PC 3 turns into a state that permits interruption from the USB chip 32 (T2). In the USB chip 32, a command transmitted from the PC 3 side via the USB bus is transferred to the transmitter and receiver 344 by unit of operations of the USB protocol engine 321 and the USB controller 331. At this point, response indicating the command has been received is not replied yet.

When the transmitter and receiver 344 receives the command, it sets a "command receiving completion" bit of the stator register 82 to 1, and interrupts the CPU 27. In this case, the CPU 27 can grasp what the interruption aims at by referring to the stator register 82. The received command is stored in the SCSI command buffer 383.

When the CPU 27 is interrupted (T3: YES) and the receiving of the SCSI command is completed (T4: YES), the CPU 27 interprets the command that the transmitter and receiver 344 received (T5). That is, when the CPU 27 recognizes that the transmitter and receiver 344 received the command by referring to the status register 82 of the transmitter and receiver 344, the CPU 27 acquires the command from the SCSI command buffer 383 and interprets it. Thereby, the CPU 27 grasps the existence, transmission direction, and size of the SCSI data.

When the CPU 27 grasps that no SCSI data exists by interpreting the command (for example, in the case of an Inquiry command or a Test Unit Ready command) and when the CPU grasps that the transmission direction of the SCSI data is from the device to the PC (sending) (for example, in the case of a Read command) (T6: YES), it writes 1 on the "command acceptance completion" bit and the "status register clear" bit of the control register 81 of the transmitter and receiver 344 (T7).

The transmitter and receiver 344 replies with a response indicating that it received the command for the PC at the timing when 1 is written on the "command acceptance completion" bit at T7. Herein, when the PC side receives the response, in the case where no SCSI data exists, the next process is receiving of a SCSI status, and in the case where the transmission direction of the SCSI data is from the device to the PC, the next process is receiving of SCSI data, so that the PC side transits to a state of waiting for the device.

On the other hand, when the CPU 27 grasps that the transmission direction of the SCSI data is from the PC to the device (receiving) by interpreting the command (for example, in the case of a Write command) (T6: NO), the CPU27 prepares for receiving SCSI data from the PC 3 (T8). In detail, the CPU secures an area necessary for receiving on the RAM 27, writes an initial address thereof into the SCSI data DMA address register 385, and writes the number of bytes to be received into the SCSI data DMA count register 386. Thereafter, the CPU writes 1 on the "command acceptance completion" bit and the "status register clear" bit of the control register 81 of the transmitter and receiver 344 (T9).

At the timing when 1 is written on the "command acceptance completion" bit at T9, the transmitter and receiver 344 replies with a response indicating that it received the command for the PC 3. Herein, when the PC 3 side receives the response, it recognizes that the device side interpreted the command and readied to receive SCSI data, and starts transmission of SCSI data.

Then, at the timing when the SCSI data DMA count register 386 becomes 0, the transmitter and receiver 344 sets the "data receiving completion" bit of the status register 82 to 1, and interrupts the CPU 27.

When the CPU 27 is interrupted (T10: YES), the CPU writes 1 on the "data receiving completion" bit and the "status register clear" bit of the control register 81 of the transmitter and receiver 344 and completes receiving of SCSI data (T11: YES). Herein, the PC 3 side is notified of that the SCSI data has reached the device, and transits to a state of waiting for the device since the next process is receiving of a SCSI status.

After the T7 and T11 (YES), the CPU 27 executes the command (T12). For example, in the case of a Test Unit Read command, the CPU judges whether the first through fourth memory cards 11 through 14 have been inserted. For example, in the case of a Read command, at this timing, data is read out from the first through fourth memory cards 11 to 14. For example, in the case of a Write command, the CPU 27 has already received data to be written (T8 through T11 described above) from PC, so that it writes the data in the first through fourth memory cards 11 through 14.

Next, when the transmission direction of the SCSI data is from the device to the PC (sending) (for example, in the case of a Read command) (T13: YES), the CPU 27 prepares for transmitting the read out data to the PC 3 (T14). In detail, the CPU secures an area necessary for transmission on the RAM 29 and stores the read out data therein, and writes an initial address thereof into the SCSI data DMA address register 385, and writes the number of bytes to be received into the SCSI data DMA count register 386. Then, the CPU 27 writes 1 on the "data transmission start" bit 1 of the control register 81 of the transmitter and receiver 344.

The transmitter and receiver 344 starts transfer of SCSI data to the PC 3 at the timing when 1 is written on the "data transmission start" bit at T14. Then, when the transfer of the SCSI data is completed, the transmitter and receiver 344 sets the "data transmission completion" bit of the status register 82 to 1 and interrupts the CPU 27.

When the CPU 27 is interrupted (T15: YES), it grasps that transfer of the SCSI data was completed, so that it writes 1 on the "status register clear" bit of the control register 81 of the transmitter and receiver 344, and completes transmission of the SCSI data (T16: YES).

After T13 (NO) and T16 (YES), the CPU 27 starts transmission of SCSI status (T17). In detail, the CPU 27 has already determined a status to be replied to the PC 3 in the above-described processing, so that the CPU writes this status on the SCSI status buffer 384 and writes 1 on the "status transmission start" bit of the control register 81 of the transmitter and receiver 344, and starts transmission of the SCSI status.

At the timing when 1 is written on the "status transmission start" bit at T17, the transmitter and receiver 344 starts transmission of SCSI status to the PC 3. Then, the transmitter and receiver 344 receives the response indicating that the PC received the SCSI status from the PC 3 side, it writes 1 on the "status transmission completion" bit of the status register 82, and interrupts the CPU 27.

When the CPU 27 is interrupted (T18: YES), it grasps that the transmission of the SCSI status has been completed, so that the CPU writes 1 on the "status register clear" bit of the control register 81 of the transmitter and receiver 344 and completes the transmission of SCSI data (T19: YES). Thereby, the status register 82 of the transmitter and receiver 344 is cleared and restores to the original state.

Figure 9:
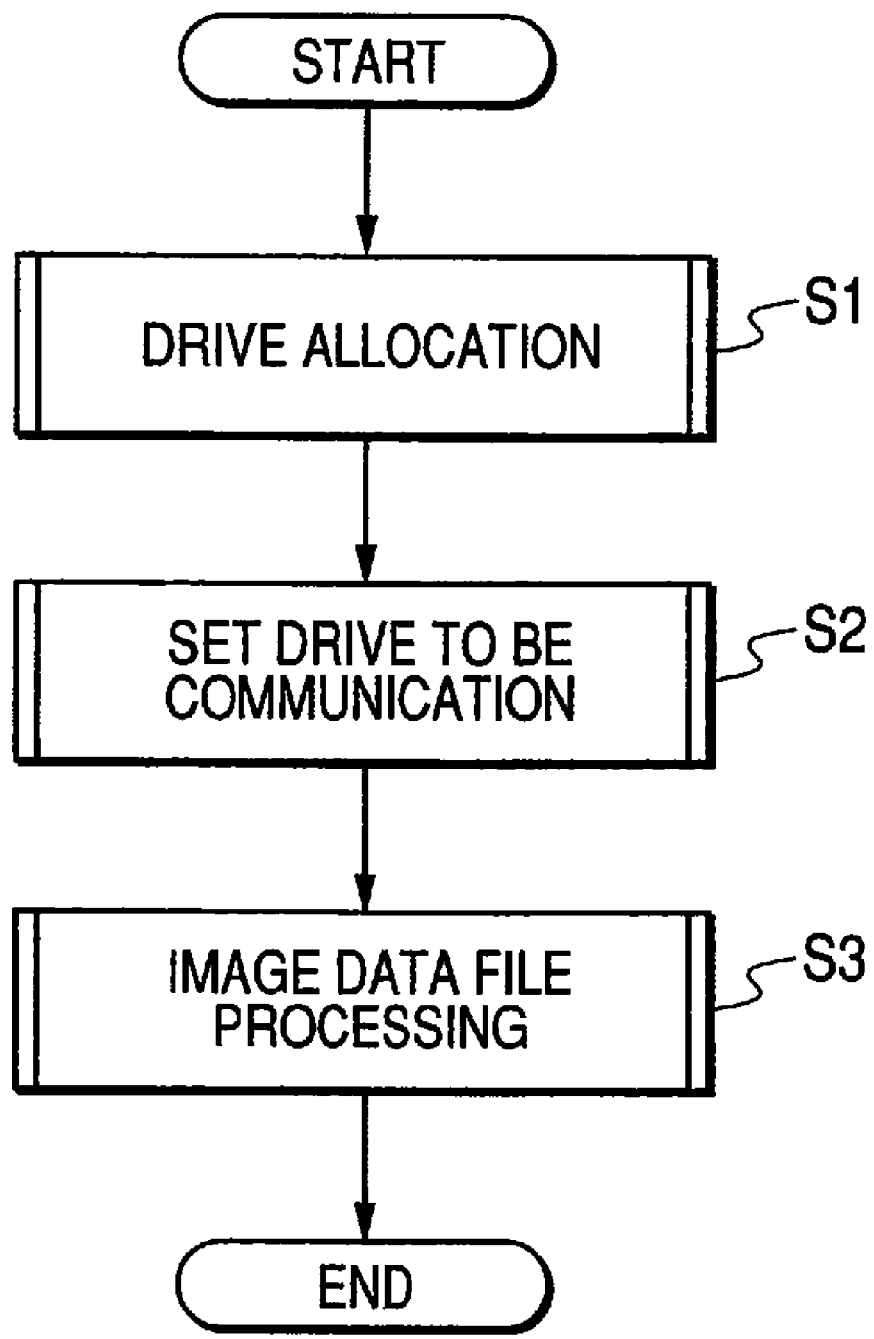
FIG. 9 is a flowchart showing flow of data communication processing to be executed in the communications system of the present invention.

Next, in this communications system 1, an example of the flow of data communication processing relating to the major function of the present invention using Inquiry data will be described. The processing of each step (function realizing unit described in claims) is executed by controlling each component by the CPU 41 of the PC 3 or the CPU 27 of the multi reader/writer 2. FIG. 9 is a flowchart showing the flow of main processing. That is, when the printing device 80 is connected to the PC 3 and the power source of each device is turned ON, first, driver allocation processing (S1) for allocating a drive to an unknown device connected to the PC 3 is executed. In this embodiment, only (the multi reader/writer 2 of) the printing device 80 is connected as a device, so that a drive is allocated to only this.

Next, drive setting processing (S2) for setting a drive selected by a user as the other communication end is performed. When the drive is set, a device corresponding to the set drive (in this embodiment, the multi reader/writer 2) is recognized as the other end of communication. Then, image data file processing (S3) for monitoring generation of a selection operation trigger generated according to an operation state on a determination key on the printing device 80 side, that is, controlling a communication event (image data file processing) relating to transmission and saving of an image data file into the PC 3 side is performed.

Figure 10:
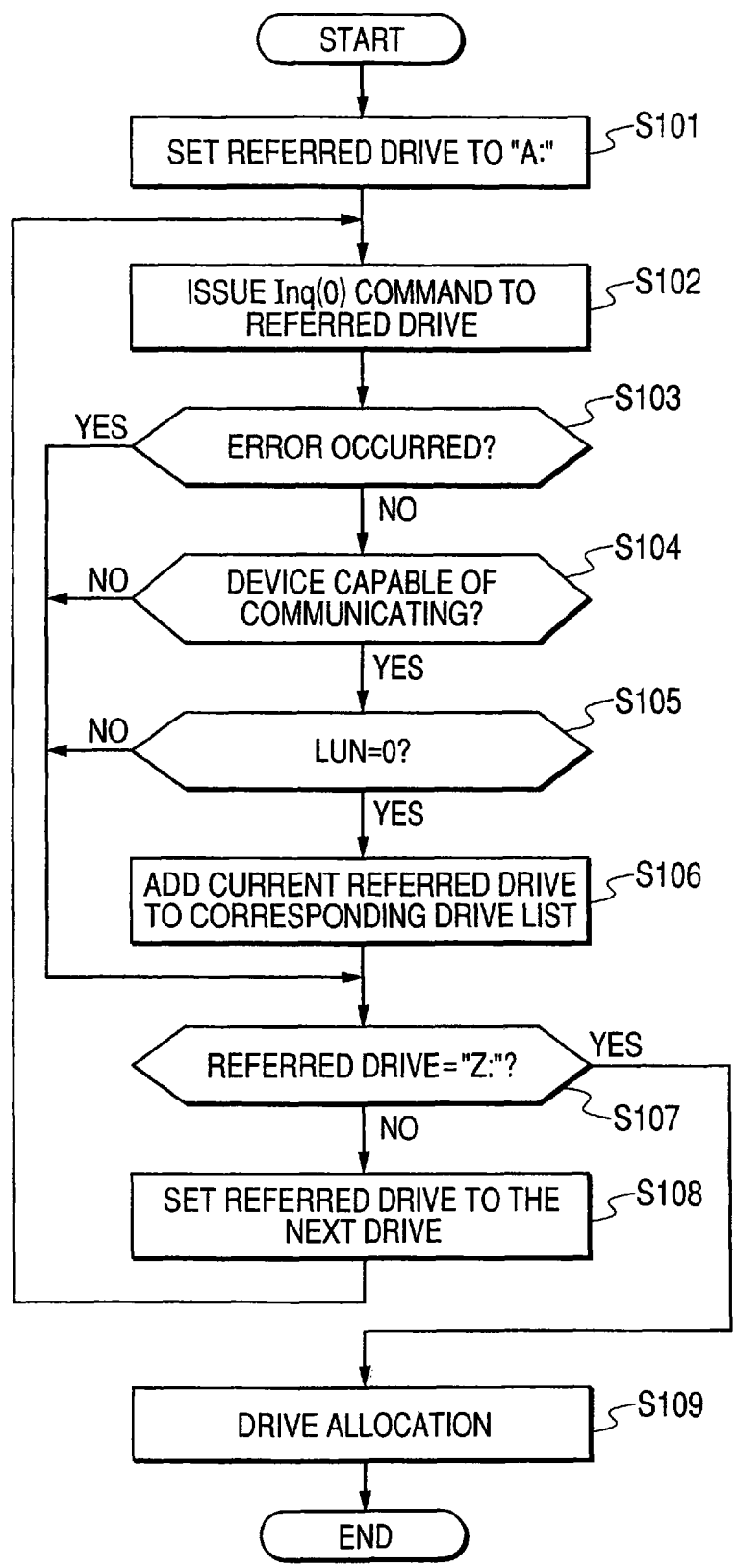
FIG. 10 is a flowchart showing flow of drive allocation processing of FIG. 9.

FIG. 10 shows details of drive allocation processing (S1) to be executed by the CPU 41 in the PC 3. First, a drive to be referred to (hereinafter, referred to as "referred drive") is initially set to the A drive (S101). This referred drive unit a drive which can be allocated on the PC 3 side, and when a plurality of drives corresponding to said drive exist, they are referred to in ascending order in drive allocation processing. The referred drive is managed by the OS kernel of the WIN 2000 of the PC 3. In this embodiment, the number of drives capable of being allocated is set to 26 of A through Z.

When the referred drive is set, next, the CPU 41 issues an Inquiry command (hereinafter, referred to as "Inq(0) command") for making the device to which the drive is allocated to reply with S/I data to the referred drive (S102). In actuality, this Inq(0) command is issued by the CPU 41 to the OS kernel, and this OS kernel regards the Inq(0) command as being issued to the referred drive. Then, a CDB(0) whose EVPD area is set to "0" is generated by the OS kernel, and transmitted to the unknown device associated with the referred drive. In the SCSI standards, when the EVPD area is set to "0," it is defined that S/I data is replied. A detailed example of CDB(0) is shown in Table 2 described above. In the data column of Table 2, each data is given in hexadecimal. In this specification, all data are given in hexadecimal unless special notation is given.

When a device associated with the referred drive exists and this device is a device capable of processing the SCSI command (SCSI command compliant device), this device replies S/I data. On the other hand, when no device exists or although a device exists, when the device is not capable of processing SCSI commands (non-SCSI compliant device), this device is not replies S/I data. At S103, error judgement is made by the CPU 41 based on whether S/I data was replied (S103). In detail, when no S/I data is replied, this is judged as an error (Yes side of S103). In this case, the subsequent process advances to Step S107. When S/I data is replied, this is not judged as an error (No side of S103). That is, it is judged that a device associated with the referred drive exists. In this case, the subsequent process advances to Step S104.

When it is judged at S103 that no error has occurred, based on replied S/I data, it is judged whether the device associated with the referred drive is a device capable of becoming a communication target, that is, whether the device is capable of communicating. In this embodiment, this step is performed for judging whether the device associated with the referred drive is the multi reader/writer 2. Also, in this embodiment, the S/I data shown in Table 3 is replied from the multi reader/writer 2 to the PC 3, and judgement processing of this step is performed based on whether data in the area of byte 0 or the area of byte 1, or the vendor ID in the area of bytes 8 to 15 and the product ID in the area of byte 16 to 31 of the replied S/I data match with ID information and the like registered in advance on the PC 3 side. At this step, when the device is judged as capable of communicating (Yes side of S104), the process advances to Step S105, and when the device is judged as incapable of communicating (No side of S104), the process advances to S107. Data "0×00" in the area of byte 0 in Table 3 indicates a direct access device, and the data "0×80" in the area of byte 1 indicates an interchangeable storage medium. The contents to be described in the respective byte areas are defined in the SCSI standards, so as to be able to refer to the standards for details.

When the process advances to S105, at this step, based on the replied S/I data, the CPU 41 judges whether the LUN of this referred drive is "0." This judgment is made based on data in the area of byte 54 of the vendor unique area in the S/I data. In this embodiment, as described above, the S/I data shown in Table 3 is replied to the PC 3 from the multi reader/writer 2. As described in the remarks column of the area of byte 54 in Table 3, the multi reader/writer 2 is programmed so that when replying with the S/I data, information indicating the physical I/F of the multi reader/writer 2 (information indicating USB in this embodiment) is stored in the higher 4 bits of the area of byte 54, and the LUN number is stored in the lower 4 bits. Therefore, the CPU 41 can acquire the information of LUN by referring to the data in the area of byte 54. Thereby, judgment processing of this step can be performed. For example, when "0×10" is stored in the area of byte 54, information that the physical I/F is a USB connector and the LUN is 0 is acquired, and when "0×23" is stored, information that the physical I/F is a SCSI connector and the LUN is 3 is acquired.

When it is judged at S105 that the LUN is "0" (Yes side of S105), the process advances to S106, and when it is judged that the LUN is not "0" (No side of S105), the process advances to S107. When the device is connected to the PC 3 in which the WIN 2000 is installed, even if information of, for example, LUN=1 is stored in the area of byte 54 on the multi reader/writer 2 side, the PC 3 side recognizes LUN=0. Therefore, the process of S105 always advances to the Yes side. In this case, the judgment processing of S105 is meaningless, so that it can be omitted.

At S106, processing for adding the current referred drive to a corresponding drive list is executed. The corresponding drive list lists referred drives to which drives are finally allocated. In detail, the corresponding drive list is developed in a predetermined storage area of the RAM 43, and corresponding referred drives are written in this storage area. Thereafter, the process advances to S107.

At S107, the CPU 41 judges whether the referred drive is the Z drive. For example, a counter memory or the like is made to count the drive referring order, and its count value is monitored by the CPU 41, whereby it is judged whether the current referred drive is the Z drive. Such judgment is for judging whether the set referred drive is the last. Herein, when it is judged that the referred drive is the Z drive, no more referable drives exist, so that the subsequent process advances to S109. When it is judged that the referred drive is not the Z drive, the referred drive is set to the next drive (S108), and then the processing from S102 are repeated until Yes is judged at S107.

When the process advances to S109, at this step, drive allocation is performed based on the corresponding drive list. Thereby, the series of drive allocation processing (S1) is ended. In this embodiment, as the external storage device, only the multi reader/writer 2 is connected, so that the multi reader/writer 2 is allocated to the A drive, and nothing is allocated to other drives.

Figure 11:
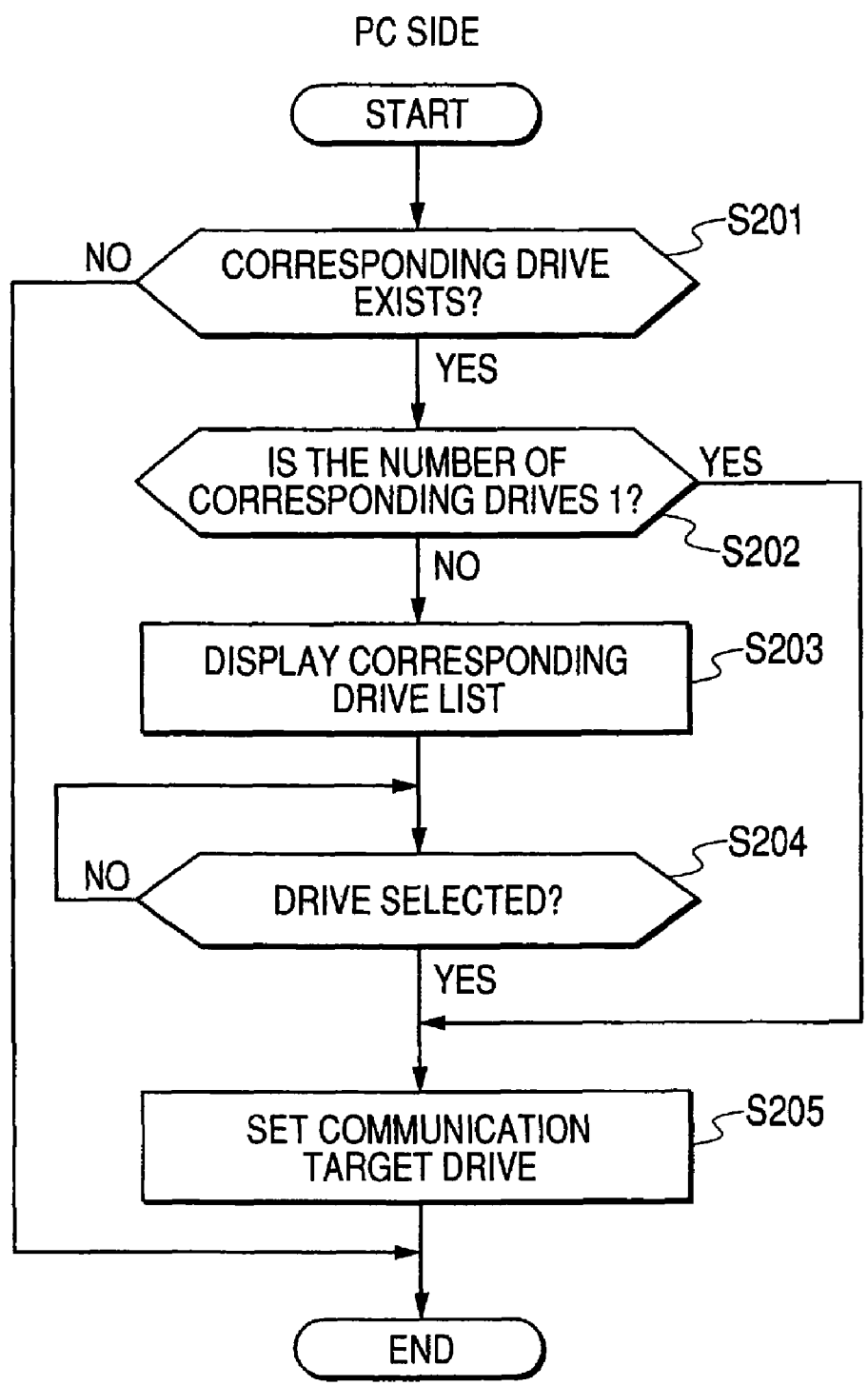
FIG. 11 is a flowchart showing flow of drive allocation processing of FIG. 9.

Next, FIG. 11 shows details of drive setting processing (S2). At S201, it is judged whether any drive allocated by the drive allocation processing (S1) (hereinafter, referred to as "corresponding drive") exists (S201). That is, it is judged whether a predetermined device is allocated to any allocatable drive in the PC 3. In this embodiment, the A drive to which the multi reader/writer 2 is allocated exists, so that it is judged that a corresponding drive exists. Thereafter, it is judged whether the number of corresponding drives is 1 (S202). On the other hand, at S201, when it is judged that no corresponding drive exists (No side of S201), there is no communication target, so that the process ends.

When it is judged at S202 that one corresponding drive exists (Yes side of S202), this corresponding drive is set as a communication target (S205). That is, a device associated with this corresponding drive is set as a communication target. In this embodiment, the A drive is set as a communication target. In other words, the multi reader/writer 2 is set as a device of a communication target.

On the other hand, when it is judged that a plurality of corresponding drives exist (No side of S202), icons indicating the corresponding drives are dialogue-displayed (S203). Thereafter, when a user selects any icon to select a desired corresponding drive (S204), the selected corresponding drive is set as a communication target (S205) Even when none of icons is selected, for example, if the ordering of priority is set for each corresponding drive, a corresponding drive with the highest priority is set as a communication target. Thereby, the series of drive setting processing (S2) is ended.

Figure 12:
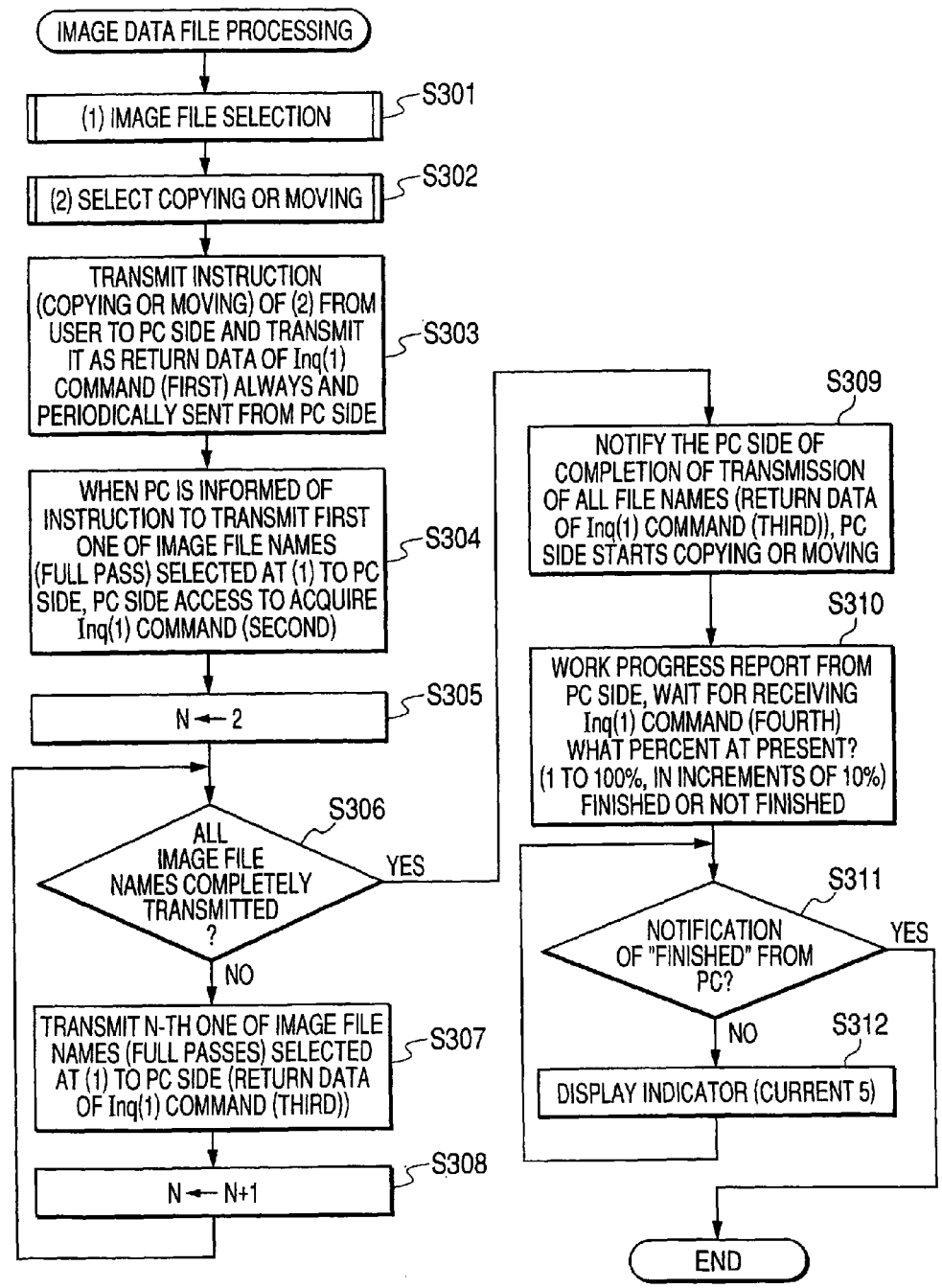
FIG. 12 is a flowchart showing flow of image data file processing (printing device side) of FIG. 9.

Next, FIG. 12 shows details of image data file processing (S3). However, in this flowchart, for easy understanding of the processing contents, the description is arranged according to the flow of the user's operation procedures on the printing device 80 side. At S301, first, processing for selecting an image data file to be saved is performed, and at S302, the file transfer mode to the PC 3 side is selected between copying (a copy source image data file in the memory card is not deleted), and moving (a copy source image data file in the memory card is deleted). These processing are executed by the CPU 27 as internal processing of the printing device 80 without communication with the PC 3 side in FIG. 2.

Figure 14:
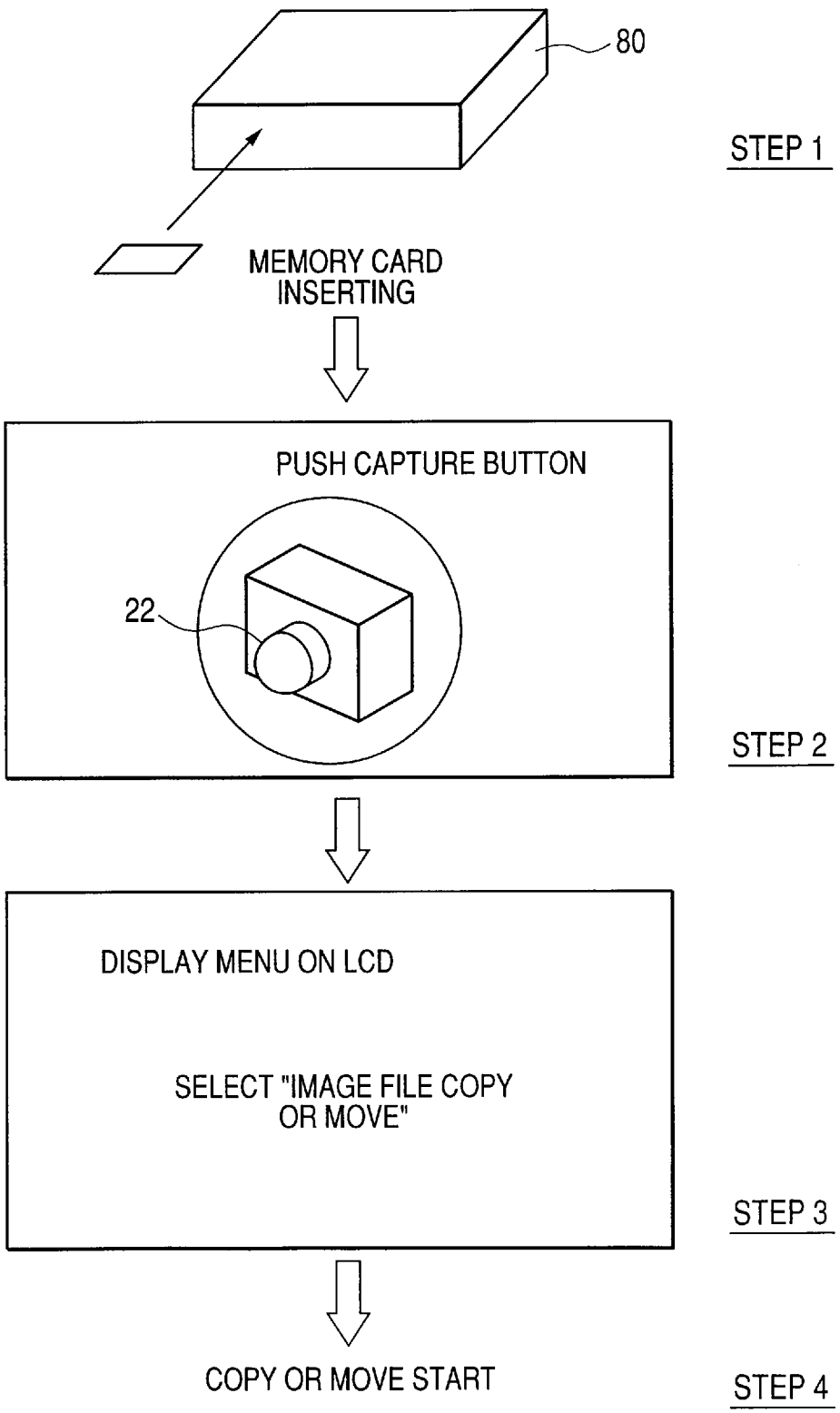
FIG. 14 is a diagram describing operation procedures of the printing device side relating to the image data file processing.
Figure 15:
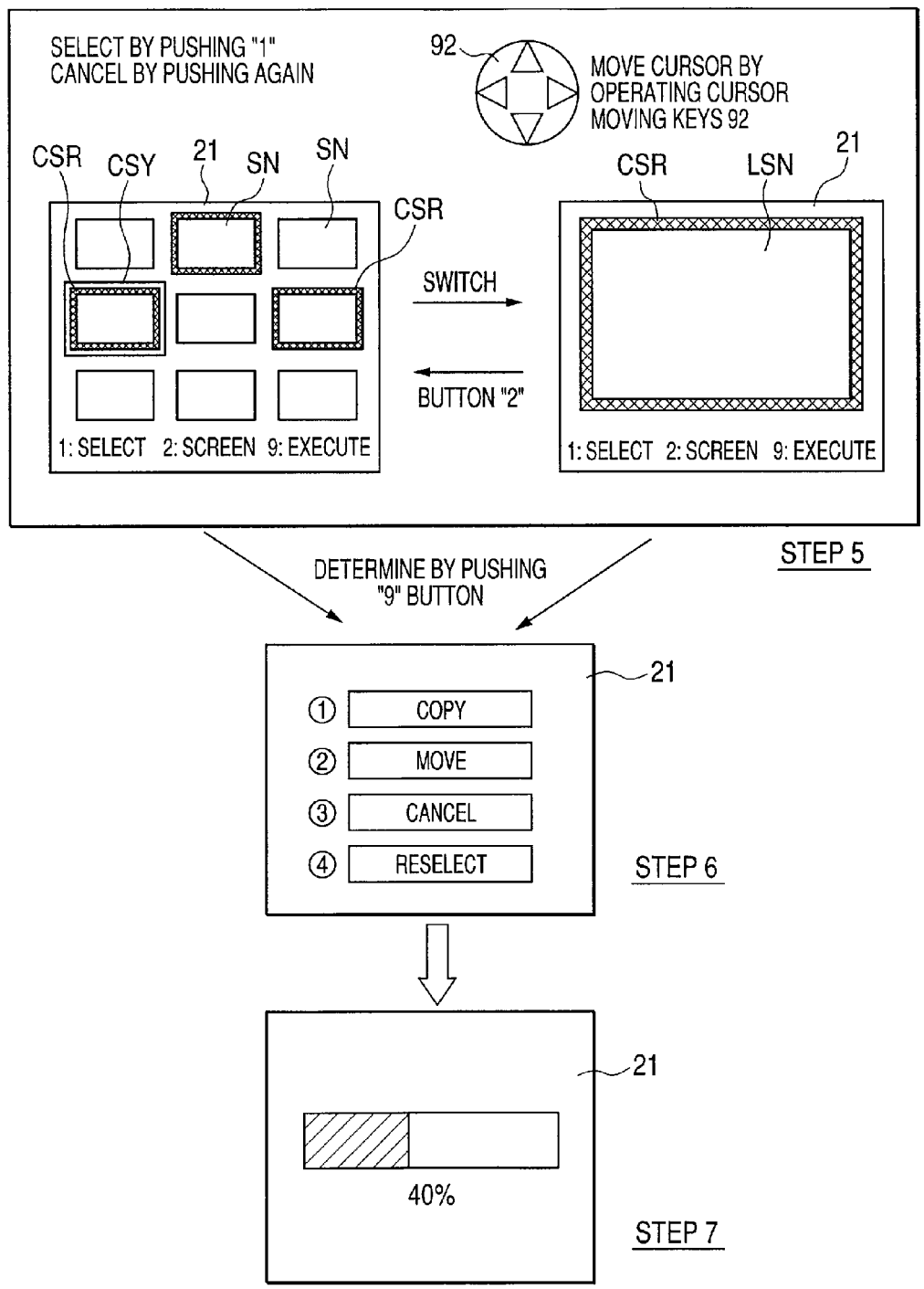
FIG. 15 is an explanatory view continued from FIG. 14.

A detailed processing example is shown in FIG. 14 and FIG. 15. An input for designating a destination (folder) for storing the image data file is performed in advance on the R/W application side. First, as shown in Step S1, a memory card is inserted in a desired slot (FIG. 1B: reference numerals 16 to 19) of the printing device 80, and the capture button 22 is pushed (operated) as in Step 2. Thereby, a menu is displayed on the LCD 22, and as in Step 3, it becomes possible to select processing for saving the image data file in the memory card into the PC 3 side, that is, "image file copying/moving" function. Then, when this "image file copying/moving" function is selected, corresponding processing starts (Step 4).

Along with the processing start, as shown in Step 5 of FIG. 15, thumbnails of image data files in the memory card are displayed as a list. A user can move the cursor CSY to a thumbnail image position of an image data file that the user desires to save (indicated as, for example, a yellow frame surrounding the thumbnails) by operating the cursor moving keys 92. On the other hand, to predetermined number keys of the numeric keypad of the keyboard 91 (FIG. 1), the functions of "select" ("1" in this embodiment"), "screen" (number "2" in this embodiment), and "execute (determine)" (number "9" in this embodiment) are allocated, respectively. When performing "select," the image data file corresponding to the thumbnail can be temporarily selected for saving. To the temporarily selected thumbnail SN, an indicator frame (for example, indicated as a red frame surrounding the thumbnail on the inner side of the cursor SCY) CSR indicating the temporarily selected state is additionally displayed.

Each time when the "screen" key ("2") is operated, processing for alternately switching between a list display mode using normal thumbnails shown on the left of Step 5 and an enlarging display mode for displaying an enlarged thumbnail (on the right of Step 5) LSN by enlarging the thumbnail (on the left of Step 5) SN to which the cursor CSY is pointed in the list display mode is performed. By repeatedly operating the "select" key ("1") while changing the position of the cursor CSY, image data files desired to be saved can be selected at a time. At Step 5 of FIG. 15, for each of the thumbnails SN selected at a time, an indicator frame CSR is additionally displayed.

When the selection of the image data file desired to be saved is finished, the "execute" key ("9") is operated. Then, the process advances to Step 6, and the screen switches to a screen for selecting which of the copying mode or the moving mode the saving of the selected image data file is performed in. The user can select his/her desired mode by operating, for example, the numeric keypad. In FIG. 15, in addition to the above-described two modes, a "cancel" mode for canceling the processing and a "reselecting" mode for reselecting an image data file can also be selected, and when the "cancel" mode is selected, the process returns to Step 2 of FIG. 14. When the "reselecting" mode is selected, the process returns to Step 5 of FIG. 15. In these modes, processing can be performed again from the corresponding step.

At Step 6, when the "copying" is selected, in the copying mode, or when the "moving" is selected, in the moving mode, image data file saving processing is performed. At this time, the selection contents of the image data file are determined, and a selection operation trigger, that is, the above-described trigger detection data signal is outputted. Processing for acquiring this trigger detection data signal on the PC 3 side is executed as follows. That is, on the PC 3 side, an Inquiry command (hereinafter, referred to as "Inq(1) command" for making the multi reader/writer 2 to reply with VPD (Vital Product Data) of the multi reader/writer 2 is issued to the drive (herein, A drive) in which the memory card is inserted. In actuality, the Inq(1) command is issued to the OS kernel 73, and 33ndled by the OS kernel 73 as being issued to the A drive. When the Inq(1) command is issued, by the OS kernel 73, CDB(1) whose EVPD area is set to "1" is generated and transmitted to the multi reader/writer 2 associated with the A drive via the USB cable 25. The CDB(1) generated at this point is shown in Table 4. That is, in the area of byte 2 of the CDB(1), a page code "0×E0" is described.

In the area of byte 4 of the CDB(1), that is, in the allocation length area, "0×10" ("00010000" in binary form) is stored. Originally, in the allocation length area, a data length to be requested to the connected device is stored. In this embodiment, the maximum value of allocation length of the multi reader/writer 2 is set in advance to a fixed length (herein, set to 15 bytes as an example, however, it is not limited to this). This number "15" can be expressed by the lower 4 bits. According to the SCSI standards, even when a value more than the maximum value set in the multi reader/writer 2 is designated as the allocation length, the allocation length of the multi reader/writer 2 is set to the maximum value, that is, 15 bytes. Therefore, even when "0×10" or "0×11" or more value is described in the allocation length area, the allocation length is set to 15 bytes. This unit that, when any of the higher 4 bits in the data of the allocation length area is "1," the data of this allocation length area can be freely used as arbitrary data (additional information) (commonly used as an allocation length set value) That is, by setting any bit of the higher 4 bits to "1," bits other than this bit in the allocation length area can be secured as a so-called virtual free space. By adding arbitrary data into the virtual free space thus secured, it becomes possible to make data communication relating to this additional information between the PC 3 and the multi reader/writer 2.

The allocation length is not always set to the fixed length (herein, 15 bytes), but according to the page code of the CDB(1), a maximum length thereof may be set. For example, in the case of a page code "0×E0," the maximum value of the allocation length is set to a fixed length with 15 bytes, and in the case of a page code "0×E2," the maximum value is set to a fixed length with 9 bytes. With such a setting, the contents of the page code are read by the CPU 27 of the multi reader/writer 2 that received the CDB(1), and according to the read contents, a corresponding fixed length is selected from a fixed length correspondence list stored in advance in the ROM 28. Of course, the allocation length set to 15 bytes or 9 bytes can be arbitrarily set.

In Table 6, communication data to be added into a free space secured in the allocation length area are shown by being sorted. As shown in the data contents columns of the table, for each data, meaning of the data itself is defined. Refer to the description in the data contents columns for details. Table 6 shows communication data to be transmitted in the case of a page code "0×E0," however, if this page code (investigation instruction data type identification information) is changed, another investigation instruction data format with a different allocation length maximum value is and different additional information contents can be generated.

TABLE 6

| | Page code: 0xE0 |
|---|---|
| Allocation area data | Data contents |
| 0x00–0x0F (00000000)–(00001111) | Allocation length |
| 0X10 (00010000) | Acquire information as to whether a determination operation has been performed |
| 0X1F (00011111) | Cancel the processing when waiting for the next transmission data |

In the left columns of FIG. 6, data to be described in the allocation length area are shown, and in the right columns, meanings of the data are shown. When the data in the left column is transmitted from the PC 3 side to the multi reader/writer 2, on the multi reader/writer 2 side, data of the allocation length area is extracted from the received CDB(1) by the CPU 27, the contents of the extracted data are analyzed, and processing according to the analyzed contents of the data is executed. The contents shown in Table 6 are listed as a table and stored in advance in the HDD 44 or ROM 42 of the PC 3 and the ROM 28 of the multi reader/writer 2.

In the CDB(1) generated in response to the Inq(1) command issued at S301, as shown in Table 5, "0×10" is described in the allocation length area. Therefore, the Inq(1) command unit a command from the PC 3 to the multi reader/writer 2 to read a trigger detection data signal corresponding to a determination key operation (that is, command to acquire information as to whether the determination operation was performed) for determining the selection of an image data file. On the other hand, on the multi reader/writer 2 side, the transmitted CDB(1) is received. Thereafter, the data "0×10" of the allocation length area in the CDB(1) is extracted by the CPU 27, and according to this data, processing for detecting the operation state (level of the trigger detection data signal) is performed.

When the operation state detection of the button 22 is finished, the result of this detection is replied by the CPU 27 to the PC 3. This reply processing is performed by writing the result of detection into the VPD (see Table 7) that is generated after receiving the CDB(1) and replied to the PC 3. In detail, as shown in Table 7, information as to whether the button was operated (whether a trigger detection data signal was generated) is written in the area of byte 7. In this embodiment, when the button was not operated, "0×00" is written, and when the button was operated, "0×01" is written. Table 7 shows VPD in the case where the button was operated.

TABLE 7

| Byte | Data | Remarks |
|---|---|---|
| 0 | 0x00 | Direct access device |
| 1 | 0XE0 | Page code |
| 2 | 0x00 | Reserve (fixed to 0) |
| 3 | 0x0B | 15 bytes (0 to 14) exist |
| 4 | nn | Device version information |
| 5 | 0x00 | Fixed to 0 |
| 6 | nn | (unused) |
| 7 | 0x01 | Determination operation state (0x00: not operated, 0x01: operated) |
| 8–14 | nn | (unused) |

Subsequently, on the PC 3 side, VPD replied from the multi reader/writer 2 is received and the area of byte 7 of this VPD is referred to, whereby a trigger detection data signal detection state, that is, information as to whether the selection of an image data file was determined can be acquired.

As described above, the series of communication processing unique to the present invention including, on the PC 3 side, Inq(1) command issue and sending of CDB(1) data in which additional information (in the above-described case, information for requesting information as to whether the operation for determining the selection of an image data file was performed) is written to the printing device 80, and reply from the printing device 80 (multi reader/writer 2) of VPE in which corresponding additional data (in the above-described case, information for reporting whether the selection determination operation was performed) for replying to the additional data, is referred to as Inq(1)/VPE additional information communication. The Inq(1) command (first) for commanding Inq(1)/VPE additional information communication relating to detection of the trigger detection data signal is periodically repeatedly issued from the PC 3 side to the printing device 80.

Next, the process advances to S304 of FIG. 12, and Inq(1)/VPE additional information communication for access the printing device 80 side from the PC 3 side to acquire the first one of file names of selected N image file data is executed by issuing a corresponding Inq(1) command (second), whereby a file name of N=1 is acquired. Thereafter, at S305, N is incremented, and the file name of N=2 and subsequent file names are successively acquired by unit of Inq(1)/VPE additional information communication by issuing the Inq(1) command (second). When transmission of all file names to the PC 3 side is finished, the process advances to Step 309, and processing for notifying the PC side of the file name transmission finish from the printing device 80 side is performed by unit of Inq(1)/VPE additional information communication by issuing an Inq(1) command (third). Subsequently, the PC 3 side reads image data files corresponding to the acquired file names from the memory cards, and executes processing for saving these into a designated storage folder according to a SCSI protocol. In the case of the moving mode, processing for deleting image data files as transmission sources in the memory cards is performed after completion of the saving.

Subsequently, at S310, on the PC 3 side, the progress of the file saving task is managed by, for example, a file system, and the progress rate of the file saving task (what percent the task progresses to) can also be grasped by a known algorithm. Then, this progress rate information is transmitted to the printing device 80 by the Inq(1)/VPE additional information communication. The CPU 27 (see FIG. 2) of the printing device 80 visually displays the task progress rate on the LCD as shown in Step 7 of FIG. 15 based on the progress rate information that was received. It is also possible that, as the progress rate information, parameter value of the progress rate is transmitted to the printing device 80 and based on this parameter, the task progress rate display screen is created and displayed on the printing device 80 side, or, for example, progress rate information is expressed by the number of characters (for example, black squares) and a character row showing the progress rate is transmitted in the form of character string code information to the printing device 80 side by unit of Inq(1)/VPE additional information communication and a character row based on this character string code information is displayed on the LCD 21. When the progress rate reaches 100 percent at S413, the process is ended.

Figure 13:
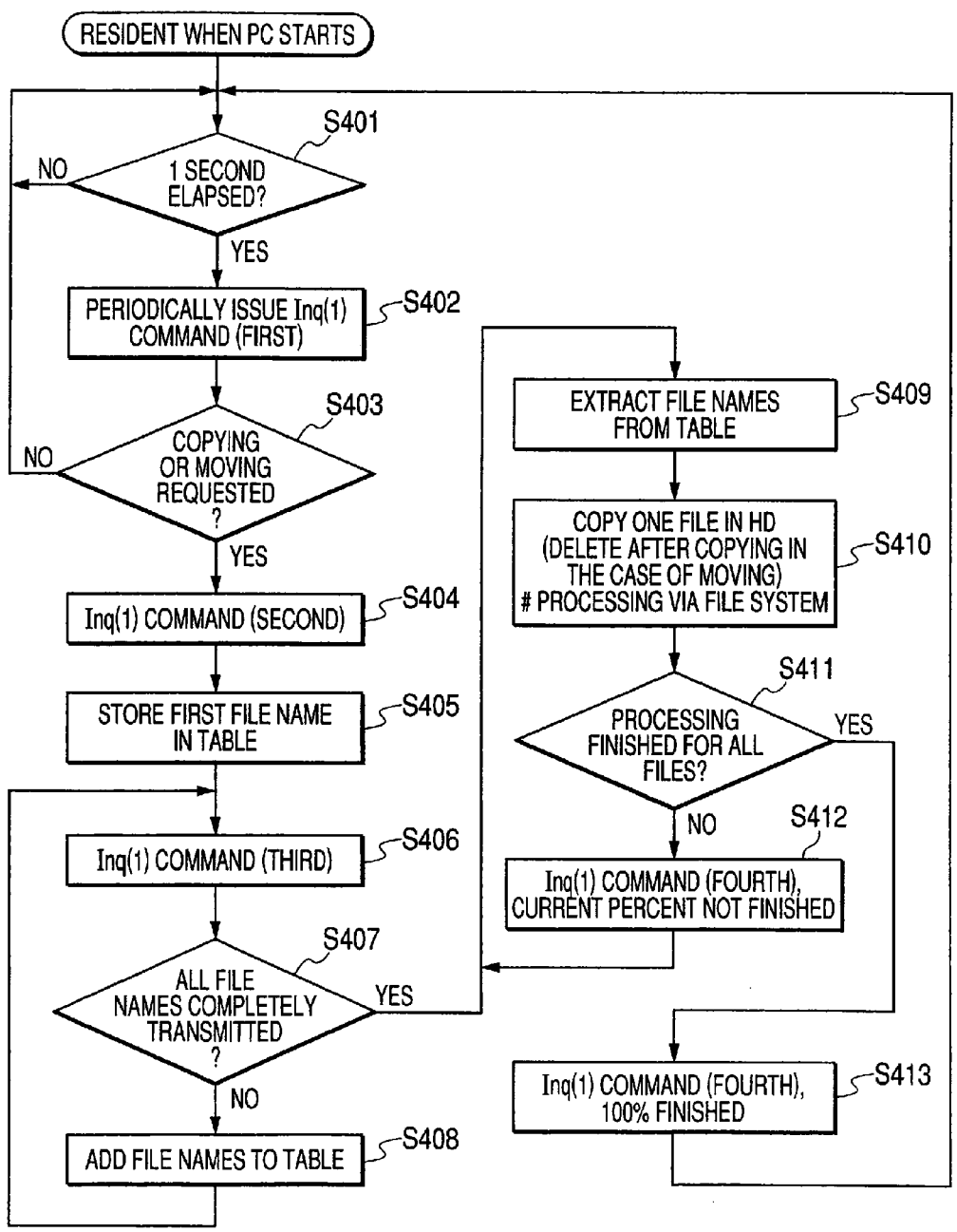
FIG. 13 is a flowchart showing flow of image data file processing (PC side)

FIG. 13 shows resident processing on the PC 3 side corresponding to FIG. 12, and one cycle time is fixed (herein, 1 second). At S401, it is judged whether the previous cycle allocation time (that is, 1 second) measured by a cycle management timer has expired, and when it expired, the process advances to S402 and the above-described Inq(1) command (first) for requesting for reporting whether the information on selection between the copying mode and the moving mode is provided is issued. At S403, it is checked whether return information through corresponding Inq(1)/VPE additional information communication includes information on selection between the copying mode and the moving mode (that is, information meaning that a determination operation was performed). When this selection information is not included, the process returns to the top and waits for the next cycle start.

On the other hand, when the selection information was acquired at S403, the process advances to S401, and the above-described Inq(1) command (second) for requesting successive transfer of selected file names is issued. At S405, file names obtained as return information through corresponding Inq(1)/VPE additional information communication are stored in the table (in the RAM 43: image data file name selection storage unit), and at S406, an Inq(1) command (third) for requesting report information as to whether the transmission of all file names has been completed (or whether there is a next file name) is issued. At S407, it is checked whether return information returned by corresponding Inq (1)/VPE additional information communication includes information that transmission of all file names has been completed. When it is not completed, at S408, newly received file names are added to the table.

On the other hand, when transmission of all file names was completed at S407, the process advances to S409, stored file names are extracted from the table, and the process advances to S410 and data files of designated file names are successively readout from the memory cards by using the file system and successively stored in a designated folder in the hard disk drive 44 (in the case of the moving mode, the data files as transmission source in the memory cards are successively deleted). It is judged at S411 whether the storing task has been finished for all files, and when it is not finished, a current task progress rate is transmitted to the printing device 80, and the process returns to S409 and repeats the processing of S409 and subsequent processing. When the task was finished, the task completion (progress rate of 100 percent) is transmitted to the printing device 80 and the processing of this cycle is ended, and the process returns to the top and repeats the same processing.

The above-described embodiment is just one example of the present invention, and can be varied as appropriate without changing the gist of the present invention. For example, the image processing device is not limited to the above-described printing device, and the image processing device may be constructed as an image taking device (for example, digital camera) which includes an image taking unit instead of the image processor and saves image data files obtained by image taking into storage media.

What is claimed is:

1. A communications system comprising:
a host device;
a peripheral device connected to the host device to communicate with the host device according to a main communication protocol, the main communication protocol for regulating an issue of a command in one direction from the host device to the peripheral device;
wherein the host device successively issues commands to the peripheral device;
the peripheral device successively executes data processing based on the commands and replies with response information corresponding to results of the data processing to the host device;
the peripheral device comprises an image processing unit, a storage device storing image data to be used in the image processing unit, the image data being accessible from the host device and the image processing unit, a selection operating unit that allows a selection operation of a user for selecting the image data, and a trigger generating unit that generates a trigger according to the selection operation;
the host device transmits a first command to the peripheral device, the first command for requesting the peripheral device to transmit a trigger generation report information indicating whether the trigger is generated in the peripheral device;
the peripheral device transmits the response information including the trigger generation report information to the host device according to the first command;
the host device judges whether the trigger is generated in the peripheral device according to the trigger generation report information and transmits a second command for requesting the peripheral device to transmit an identification information of the image data corresponding to the selection operation to the host device, when it is judged that the trigger is generated in the peripheral device;

the peripheral device transmits the response information including the identification information to the host device according to the second command;

the host device instructs the peripheral device to read the image data from the storage device to transmit to the host device, according to the identification information, and stores the image data in a predetermined storage area thereof.

2. The communications system according to claim 1, wherein the peripheral device comprises a display unit that displays a file list of image data files stored in the storage device and an image data file name selection storage unit that stores an image data file name corresponding to the selection operation among image data file names in the file list displayed on the display unit, and the peripheral device transmits the response information including the image data file name stored in the data file name selection storage unit to the host device, when a confirmation of the selection operation is performed at the selection operation unit.

3. The communications system according to claim 1, wherein the peripheral device comprises a printer having a printing unit as the image processing.

4. The communications system according to claim 1, wherein the first command is repeatedly and continuously issued at predetermined time intervals from the host device to the peripheral device.

5. The communications system according to claim 1, wherein, the peripheral device and the host device are connected via a serial communication mechanism which enables a polling of the peripheral device from the host device and disable a reverse-polling of the host device from the peripheral device;

the first command and second command are transmitted to the peripheral device as a polling operation of the host device for the peripheral device.

6. The communications system according to claim 5, wherein the serial communication mechanism uses a USB protocol.

7. The communications system according to claim 1, wherein the host device further comprises:

an investigation instruction data creating unit that creates an investigation instruction data having a predetermined frame format indicating investigation report instruction contents and including additional information written into a predetermined field of the frame when the investigation instruction data creating unit issues an investigation request command for requesting the peripheral device to perform investigation report processing for the peripheral device itself, and an investigation instruction data transmitting unit that transmits the created investigation instruction data to the peripheral device; and the peripheral device further comprises:

an investigation report data generating unit that generates a investigation report data having a predetermined frame format based on the investigation instruction data an investigation report data transmitting unit that transmits the response information including the investigation report data, and an additional information extracting unit that extracts the additional information from the predetermined field of the received investigation instruction data.

8. The communications system according to claim 7, wherein the investigation report data generating unit writes corresponding additional information corresponding to additional information from the host device into a predetermined frame of the investigation report data;

the investigation report data transmitting unit transmits the response information including the investigation report data to the host device, the investigation report data having the corresponding additional information.

9. The communications system according to claim 8, wherein the first command includes the investigation request command;

the investigation instruction data includes the trigger generation report instruction information of the peripheral device as the additional information;

the corresponding investigation report data includes the trigger generation report information as the additional information;

10. The communications system according to claim 7, wherein in the investigation instruction data, the investigation instruction data creating unit writes the additional information so as to be commonly used as main stored information in a field that is regulated in the main communication protocol to store information other than the additional information as the main stored information to be stored in the field.

11. The communications system according to claim 10, wherein in the investigation instruction data, a field that stores allocation length information of a memory area on the storage device to be allocated to the reading or writing of data from and onto the storage device when executing a communication event relating to the data reading or writing according to the main communication protocol is secured as an allocation length setting field; and the additional information to be commonly used as the allocation length information is written in the allocation length setting field in which the allocation length information is regarded as the main stored information.

12. The communications system according to claim 11, wherein in the main communication protocol, the size of the allocation length setting field is determined to be a fixed bit length;

the number of bits expressing a settable maximum value of the allocation length by byte is set to be less than a total number of bits of the allocation length setting field;

an actual set value of the allocation length is determined as the maximum value when an allocation length exceeding the maximum value is described in the allocation length setting field;

the described allocation length value exceeding the maximum value corresponds to a content of additional information.

13. The communications system according to claim 7, wherein the peripheral device comprises an exchange notifying information holding unit that holds exchange notifying information of exchange of the storage device to be notified to the host device when the storage device is exchanged, and an exchange notifying information holding control unit that clears the exchange notifying information held in the exchange notifying information holding unit after execution of a predetermined type-1 command when receiving the type-1 command from the host device, and that reserves the holding state of exchange notifying information by the exchange notifying information holding unit after executing a type-2 command other than the type-1 command when receiving the type-2 command; and the type-2 command is used as the investigation request command.

14. The communications system according to claim 13, wherein the investigation request command includes a configuration/attribution investigation request command configuring the type-2 command that instructs the peripheral device to report configuration/attribution identification information for identifying a configuration and an attribution of the peripheral device.

15. The communications system according to claim 14, wherein the main communication protocol includes a SCSI protocol and the investigation request command includes an Inquiry command.

16. A peripheral device connectable to a host device to communicate with the host device according to a main communication protocol, the main communication protocol for regulating an issue of a command in one direction from the host device to the peripheral device, successively executing a data processing based on the commands and replies with response information corresponding to results of the data processing to the host device, the peripheral device comprising:

an image processing unit;

a storage device that stores image data to be used in the image processing unit, the image data being accessible from the host device and the image processing unit;

a selection operating unit that allows a selection operation of a user for selecting the image data, and a trigger generating unit that generates a trigger according to the selection operation;

wherein the peripheral device transmits the response information including trigger generation report information to the host device according to a first command, the first command for requesting the peripheral device to transmit a trigger generation report information indicating whether the trigger is generated in the peripheral device;

wherein the storage device includes a storage medium that stores the image data and that is detachable from the storage device.

17. The communications system according to claim 1, wherein the storage device includes a storage medium that stores the image data and that is detachable from the storage device.

18. The peripheral device according to claim 16, wherein the storage device includes a storage medium that stores the image data and that is detachable from the storage device.

* * * * *